(12) United States Patent
Kim et al.

(10) Patent No.: US 10,502,992 B2
(45) Date of Patent: Dec. 10, 2019

(54) LIQUID CRYSTAL DISPLAY DEVICE

(71) Applicant: LG DISPLAY CO., LTD., Seoul (KR)

(72) Inventors: Sungwoo Kim, Daegu (KR); Jookwan Han, Chilgok-gun (KR); Jiho Son, Gwangju (KR); Minji Kim, Ulsan (KR); Dongtack Shin, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 41 days.

(21) Appl. No.: 15/663,664

(22) Filed: Jul. 28, 2017

(65) Prior Publication Data

US 2018/0031901 A1 Feb. 1, 2018

(30) Foreign Application Priority Data

Jul. 29, 2016 (KR) .................. 10-2016-0097378
Oct. 31, 2016 (KR) .................. 10-2016-0143570
Nov. 23, 2016 (KR) .................. 10-2016-0156735

(51) Int. Cl.
*G02F 1/1333* (2006.01)
*G02F 1/1335* (2006.01)
*G02F 1/1345* (2006.01)

(52) U.S. Cl.
CPC .... *G02F 1/133308* (2013.01); *G02F 1/13452* (2013.01); *G02F 1/133345* (2013.01);
(Continued)

(58) Field of Classification Search
CPC ........... G02F 1/133308; G02F 1/13452; G02F 1/133514; G02F 1/133345; G02F 2001/133314; G02F 2202/28; G02F 2201/46; G02F 1/0121; G02F 1/0327; G02F 1/076; G02F 1/133; G02F 1/13306; G02F 1/1345; G02F 1/13454; G02F 1/13458; G02F 2001/133388; G02F 2001/133612; G02F 2001/13456; G02F 1/133608; G02F 2001/133311; G02F 2001/133317; G02F 2001/133332; G02F 2001/133322; G02F 2001/133325; G02F 2001/133328; G02F 2001/133331; G02F 2001/133334;
(Continued)

(56) References Cited

U.S. PATENT DOCUMENTS

2005/0243238 A1* 11/2005 Cha .................. G02B 6/0088
349/58
2006/0040520 A1* 2/2006 Moh ................ G02F 1/133308
439/66

(Continued)

FOREIGN PATENT DOCUMENTS

KR 20150077105 A * 7/2015

OTHER PUBLICATIONS

English translation of KR-20150077105-A, Title: Liquid Crystal Display, Author: Lee Hyo Jin; Date of publication: Jul. 7, 2015 (Year: 2015).*

*Primary Examiner* — Shan Liu
(74) *Attorney, Agent, or Firm* — Seed IP Law Group LLP

(57) ABSTRACT

A liquid crystal display device includes: a liquid crystal panel; a driving PCB connected to the liquid crystal panel; and a PCB fixing bracket protruding from a cover bottom disposed below the liquid crystal panel, and having a PCB accommodating portion. Owing to the PCB fixing bracket, problems such as a line defect or separation of a fixing tape that occur when a PCB is attached, may be prevented.

24 Claims, 16 Drawing Sheets

(52) U.S. Cl.
CPC .......... *G02F 1/133514* (2013.01); *G02F 2001/133314* (2013.01); *G02F 2201/46* (2013.01); *G02F 2202/28* (2013.01)

(58) Field of Classification Search
CPC ... G09G 2300/0426; G09G 2300/0408; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2225/107; H01L 24/50
USPC ...................................... 349/149–152, 58–60
See application file for complete search history.

(56) References Cited

U.S. PATENT DOCUMENTS

| | | | | |
|---|---|---|---|---|
| 2008/0079864 | A1* | 4/2008 | Nishimura | G02F 1/13452 349/58 |
| 2008/0089018 | A1* | 4/2008 | Kim | G02F 1/133308 361/679.01 |
| 2010/0073888 | A1* | 3/2010 | Azuma | G02F 1/133308 361/749 |
| 2010/0128193 | A1* | 5/2010 | Hwang | G02F 1/133608 349/58 |
| 2010/0165244 | A1* | 7/2010 | Shin | G02F 1/133308 349/62 |
| 2012/0099341 | A1* | 4/2012 | Kwon | G02B 6/0085 362/612 |
| 2012/0262946 | A1* | 10/2012 | Kuo | G02F 1/133608 362/632 |
| 2013/0141664 | A1* | 6/2013 | Toyoyama | G02F 1/1333 349/59 |
| 2013/0155349 | A1* | 6/2013 | Huang | G02F 1/13452 349/60 |
| 2013/0215359 | A1* | 8/2013 | Chun | G02F 1/1333 349/58 |
| 2015/0153609 | A1* | 6/2015 | Kim | G02F 1/133308 362/606 |
| 2015/0370120 | A1* | 12/2015 | Song | G02F 1/133382 349/58 |
| 2016/0054615 | A1* | 2/2016 | Kim | G02B 6/0081 362/611 |
| 2016/0178956 | A1* | 6/2016 | Kim | G09F 9/30 349/58 |
| 2016/0209580 | A1* | 7/2016 | Hosoki | G02F 1/13452 |
| 2017/0293176 | A1* | 10/2017 | Bae | H01L 27/124 |

* cited by examiner

LIQUID CRYSTAL DISPLAY DEVICE

CROSS-REFERENCE TO RELATED APPLICATION

This application claims the benefit of earlier filing dates of and the rights of priority from Korean Applications No. 10-2016-0097378, filed on Jul. 29, 2016, No. 10-2016-0143570, filed on Oct. 31, 2016, and No. 10-2016-0156735, filed on Nov. 23, 2016, the contents of which are all incorporated by reference herein in their entirety.

BACKGROUND

Technical Field

This specification relates to a display device, and more particularly, to a liquid crystal display device having a structure to fix a printed circuit board (PCB).

Description of the Related Art

Generally, a liquid crystal display device is being widely applied due to its characteristic such as a light weight, a small thickness and a low power consumption. Accordingly, the liquid crystal display device is being developed to have a large area, a small thickness and a low power consumption in order to satisfy a user's request.

The liquid crystal display device, a display device for displaying an image by controlling the amount of light which passes through a liquid crystal, is much used due to its advantages such as a small thickness and a low power consumption.

The liquid crystal display device is provided with a gate driving PCB having a gate driving portion for supplying a signal to gate wires (not shown) inside a liquid crystal panel, and a data driving PCB for supplying a data signal to data wires (not shown).

The LC panels of the gate driving PCB and the data driving PCB are electrically connected to each other by a Chip-On-Film (COF) connected to an edge of the LC display device.

Both sides of an edge part of the driving PCB are coupled to PCB fixing portions disposed on a side surface of a cover bottom, by screws or a fixing tape.

Especially, in case of the conventional flat notebook model, the driving PCB is fixed to a bracket of the cover bottom in order to prevent inferior static electricity (ESD) of components on a circuit.

In the conventional art, the driving PCB is fixed to the bracket of the cover bottom by using screws or a fixing tape.

However, in case of fixing the driving PCB by using the screws, line defects may occur while a user performs a test to open and close a product.

Further, in case of fixing the driving PCB to the bracket by using the fixing tape, the fixing tape may be separated when the driving PCB and the bracket are attached to each other. This may cause an inferior connection.

In another conventional LCD device, the PCB bracket is formed as a part of a side surface of the cover bottom is cut, and the cut part is extended outward. An opening is formed at the cut part of the side surface of the cover bottom.

If the opening formed at the cut part of the side surface of the cover bottom has a large size, an LED array is partially exposed to the outside through the opening, resulting in a hot spot. Further, since components inside a backlight unit expand at a high temperature and a high humidity, the LED array is exposed to the outside through the opening of the cover bottom. This may cause a hot spot on an image.

If the opening formed on the side surface of the cover bottom has a small size, a conductive tape attached to the PCB bracket having the same size as the opening has a small size. This may cause the conductive tape to be detached from the source PCB due to its weak bonding force. As a result, there is a problem in grounding the source PCB.

Further, in the conventional LCD device, a bracket is provided at one side of a cover bottom in order to fix a flat-type COF and a source PCB, and screws are coupled to the source PCB. With such a configuration, the source PCB and the cover bottom are electrically connected to each other through the screws, and the source PCB is grounded.

However, such a coupling method has a limitation in reducing a thickness of the LCD device due to the screws, and has a difficulty in controlling a height of the bracket formed at the cover bottom. That is, it is difficult to reduce a thickness of a screw head, and a minimized screw thread should be formed for coupling.

Further, a cut-out portion is formed as a part of the cover bottom is cut-out in order to form a bracket, and light leakage occurs due to the cut-out portion. The reason is because it is difficult to support the LCD device at the cut-out portion of the cover bottom, as an LED FPCB expands when an array emits heat after being turned on.

BRIEF SUMMARY

Therefore, an aspect(s) of the disclosure is to provide a liquid crystal display device capable of improving the conventional problems when a PCB is fixed thereto, such as a line defect and separation of a fixing tape.

Another aspect(s) of the disclosure is to provide a liquid crystal display device capable of preventing a hot spot by intensifying a grounding function of a source printed circuit board (PCB), by changing a method to fix and ground the source PCB.

Another aspect(s) of the disclosure is to provide a liquid crystal display device having a flat-type source PCB, capable of requiring no bracket structure and no screws of a cover bottom, by fixing a PCB and grounding the PCB to the cover bottom by using a cover shield.

Another aspect(s) of the disclosure is to provide a liquid crystal display device capable of solving noise generated when a cover shield is attached to a PCB.

To achieve these and other advantages and in accordance with the purpose of this specification, as embodied and broadly described herein, there is provided a liquid crystal display device, comprising: a liquid crystal panel; a driving PCB connected to the liquid crystal panel; and a PCB fixing bracket protruding from a cover bottom disposed below the liquid crystal panel, and having a PCB accommodating portion.

In the LCD device, the PCB fixing bracket may be extended by protruding from one side surface of the cover bottom.

In the LCD device, the PCB accommodating portion may be provided at one end of the PCB fixing bracket.

In the LCD device, the PCB accommodating portion may include a lower horizontal portion; an upper horizontal portion; and a side surface portion connecting the lower horizontal portion and the upper horizontal portion to each other.

In the LCD device, the PCB accommodating portion may accommodate therein a part of the driving PCB.

In the LCD device, a PCB ground region may be formed on at least one of an upper surface and a lower surface of the driving PCB which contacts the PCB fixing bracket.

In the LCD device, the PCB ground region may be formed of a material selected from metallic materials including gold (Au).

In the LCD device, a plurality of convex portions and concave portions may be provided on an inner side surface of the upper horizontal portion of the PCB accommodating portion.

In the LCD device, a plurality of embossed portions may be provided on an inner side surface of the upper horizontal portion of the PCB accommodating portion.

In the LCD device, a clip structure may be provided on an inner side surface of the upper horizontal portion of the PCB accommodating portion.

According to another aspect of the present disclosure, there is provided a liquid crystal display device, comprising: a liquid crystal (LC) panel; a backlight unit and a cover bottom disposed on a rear surface of the LC panel; a printed circuit board (PCB) bracket extended from a side surface of the cover bottom; a source PCB electrically connected to the LC panel, disposed on an upper surface of the PCB bracket, and having a ground region on an upper surface thereof; and a cover shield attached to the LC panel and the cover bottom, and having a ground region contact portion electrically contacting the ground region of the source PCB.

The cover shield may be bent to cover from an upper surface of the LC panel to a lower surface of the cover bottom, in order to cover an upper surface, a lower surface and side surfaces of the source PCB.

An insulating sheet may be provided on an inner surface of the cover shield, and a conductive adhesion portion is provided on an inner surface of the cover shield disposed at upper and lower sides of the insulating sheet.

A contact hole, through which the ground region contact portion electrically connected to the ground region of the source PCB is exposed, may be formed at the insulating sheet.

A non-conductive adhesion tape may be interposed between the source PCB and the PCB bracket.

The cover shield may be formed of any one of conductive materials including aluminum (Al).

According to another aspect of the present disclosure, there is provided a liquid crystal display device, comprising: a source printed circuit board (PCB) connected to a liquid crystal (LC) panel, and having one or more ground regions on one surface thereof; a cover bottom for accommodating and supporting the LC panel and a backlight unit; and a conductive cover shield attached to the LC panel and the cover bottom with the source PCB enclosed, and attached to the ground region of the source PCB.

An insulating film may be attached to an inner surface of the cover shield such that a ground surface attached to the ground region of the source PCB is exposed.

A circuit component may be mounted to another surface of the source PCB.

A first upper insulating film having no viscosity may be attached to an inner surface of one upper part which faces the ground region of the source PCB.

A second insulating film having a viscosity may be attached to another upper part of the cover shield.

The second insulating film may be separated into a plurality of regions such that the ground surface may be exposed to outside.

A first lower insulating film having no viscosity may be attached to an inner surface of a lower part of the cover shield which faces the circuit component.

The first upper and lower insulating films may each be partially overlapped with the second insulating film.

The cover shield may be provided with a plurality of cutting lines for bending at a middle part thereof between the upper part and the lower part.

The first upper insulating film may be attached to an inner surface of the cover shield except for an upper end of the cover shield, and the upper end of the cover shield may be attached to the LC panel.

The first lower insulating film may be attached to an inner surface of the cover shield except for a lower end of the cover shield, and the lower end of the cover shield may be attached to the cover bottom.

The liquid crystal display device further comprises a flat type chip-on-film (COF) for connecting the LC panel and the source PCB with one another.

The COF may be attached to a pad region of an array substrate of the LC panel, and a pad for compensating for a stair-stepped portion from a color filter substrate may be provided at the pad region.

The first upper insulating film of the cover shield may be disposed on the pad.

The first lower insulating film of the cover shield may be disposed on a rear surface of the cover bottom.

Firstly, since the driving PCB is fixed to the 'ㄷ'-shaped PCB accommodating portion, an additional structure to fix a PCB, e.g., the conventional screws or fixing tape may not be used.

Further, since the driving PCB can move in the PCB accommodating portion of the PCB fixing bracket, problems such as a line defect or separation of the fixing tape, occurring due to the conventional screws or fixing tape, may be prevented.

Further, since the conventional screws or fixing tape for fixing a PCB are not required, costs are reduced.

Further, since the PCB ground region is formed on the upper surface and the lower surface of the driving PCB which contact the PCB fixing bracket, the PCB ground region is increased than the conventional one. This may allow stability with respect to inferior external static electricity to be obtained.

In the LCD device according to the present disclosure, since the ground region of the source PCB contacts the ground region contact portion of the cover shield, an entire surface of the source PCB is grounded. This may enhance a grounding function of the source PCB.

Further, the non-conductive adhesion tape having a high viscosity is used to adhere the source PCB onto an upper surface of the PCB bracket, with a smaller size. This may reduce a size of an opening cut-out from a side surface of the cover bottom in order to form the PCB bracket, resulting in preventing a hot spot due to exposure of an LED array through the opening.

Further, since the source PCB is attached to the PCB bracket by the non-conductive adhesion tape having a high viscosity, a fixing force of the source PCB may be intensified.

In the LCD device according to another embodiment of the present disclosure, a bracket structure and screws for fixing the PCB are not used because the PCB is fixed and is grounded to the cover bottom by using the cover shield. As a result, processes can be simplified, costs and an inferior rate can be reduced, and the LCD device can have a slim configuration.

In the LCD device according to another embodiment of the present disclosure, the cover shield is attached only to a part of the source PCB to increase a movement of the source PCB. This can reduce noise generated, comparing to that the cover shield is attached to an entire surface of the source PCB, and facilitate a re-operability.

Further scope of applicability of the present disclosure will become more apparent from the detailed description given hereinafter. However, it should be understood that the detailed description and specific examples, while indicating preferred embodiments of the disclosure, are given by way of illustration only, since various changes and modifications within the concept and scope of the disclosure will become apparent to those skilled in the art from the disclosure.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION

Hereinafter, embodiments of the present disclosure will be explained in more detail with reference to the attached drawings. In this specification, the same or equivalent components will be provided with the same reference numbers, and description thereof will not be repeated. If it is regarded that detailed descriptions of the related art are not within the range of the present disclosure, the detailed descriptions will be omitted.

In addition, terms, such as first, second, A, B, (a), (b) or the like, may be used herein when describing components of the present disclosure. Each of these terminologies is not used to define an essence, order, or sequence of a corresponding component but used merely to distinguish the corresponding component from other component(s). It should be noted that if it is described in the specification that one component is "connected," "affixed," or "attached" to another component, a third component may be "interposed" between the first and second components, although the first component may be directly "connected," "affixed," or "attached" to the second component. In the same context, it shall be understood that, when it is described that any component is formed "on", "over", or "under" another component, the former may be formed on the latter directly or indirectly through a third component.

The present disclosure will be explained by taking a liquid crystal display (LCD) device among display devices, as an example. However, the present disclosure is not limited to this, and may be also applicable to an Organic Light Emitted Diode (OLED) display device, a flat display device, an electrophoresis display device, etc. as well as such an LCD device.

Figure 1:
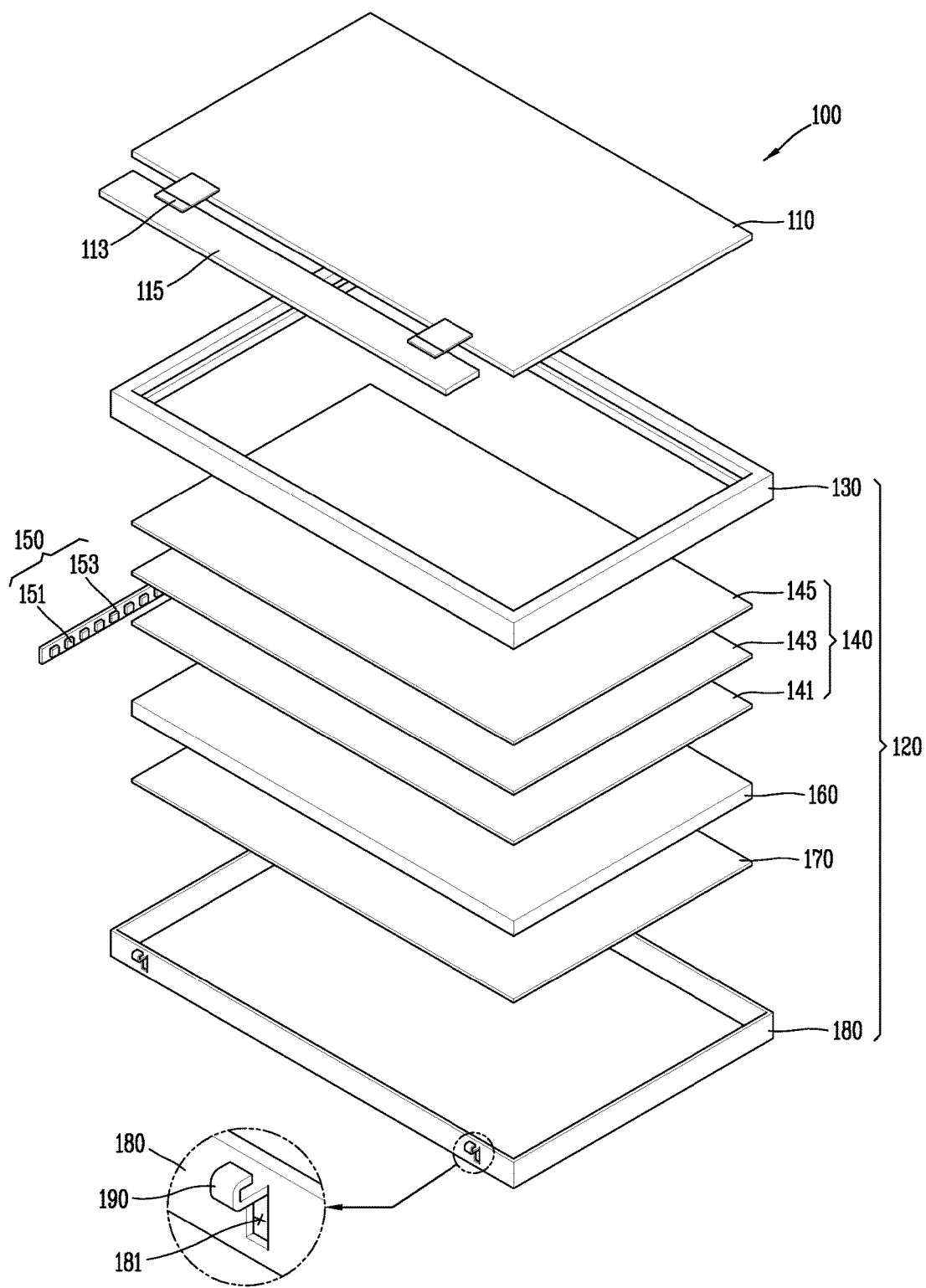
FIG. 1 is a disassembled perspective view of a liquid crystal display device according to a first embodiment of the present disclosure.

FIG. 1 is a disassembled perspective view of a liquid crystal display device according to an embodiment of the present disclosure.

Figure 2:
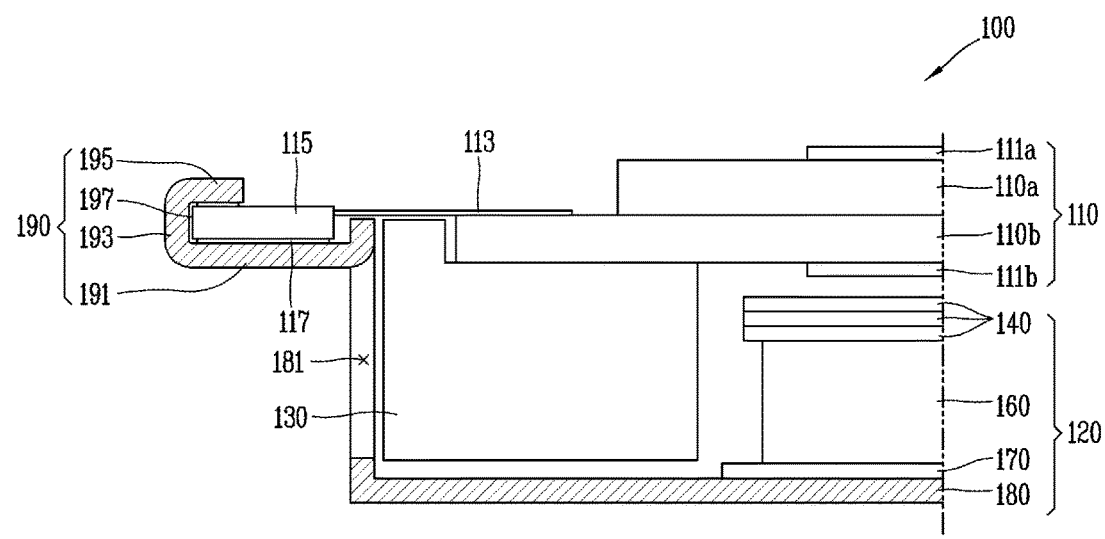
FIG. 2 is a sectional view of a liquid crystal display device according to a first embodiment of the present disclosure, which schematically illustrates a fixed state of a driving PCB into a PCB fixing bracket of a cover bottom by insertion.

FIG. 2 is a sectional view of a liquid crystal display device according to an embodiment of the present disclosure, which schematically illustrates a fixed state of a driving PCB into a PCB fixing bracket of a cover bottom by insertion.

Figure 3:
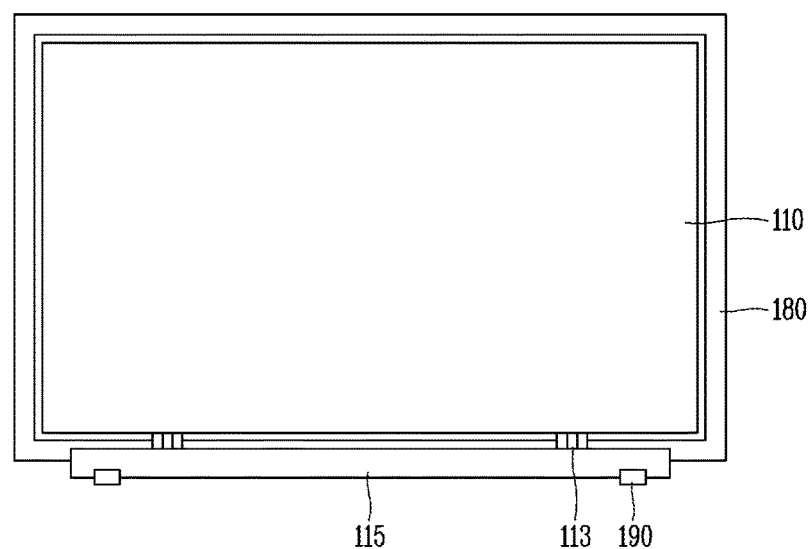
FIG. 3 is a planar view of a liquid crystal display device according to a first embodiment of the present disclosure, which schematically illustrates a fixed state of the driving PCB into the PCB fixing bracket.

FIG. 3 is a planar view of a liquid crystal display device according to an embodiment of the present disclosure, which schematically illustrates a fixed state of the driving PCB into the PCB fixing bracket.

Figure 4:
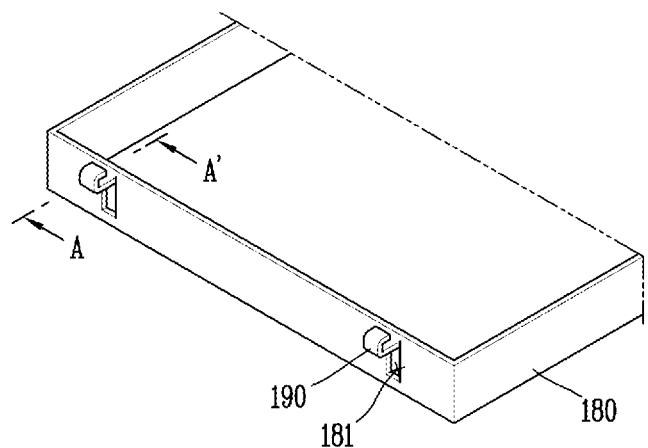
FIG. 4 is an enlarged perspective view of a cover bottom of a liquid crystal display device according to a first embodiment of the present disclosure, which shows the PCB fixing bracket provided on one side surface of the cover bottom.

FIG. 4 is an enlarged perspective view of a cover bottom of a liquid crystal display device according to an embodiment of the present disclosure, which shows the PCB fixing bracket provided on one side surface of the cover bottom.

Figure 5:
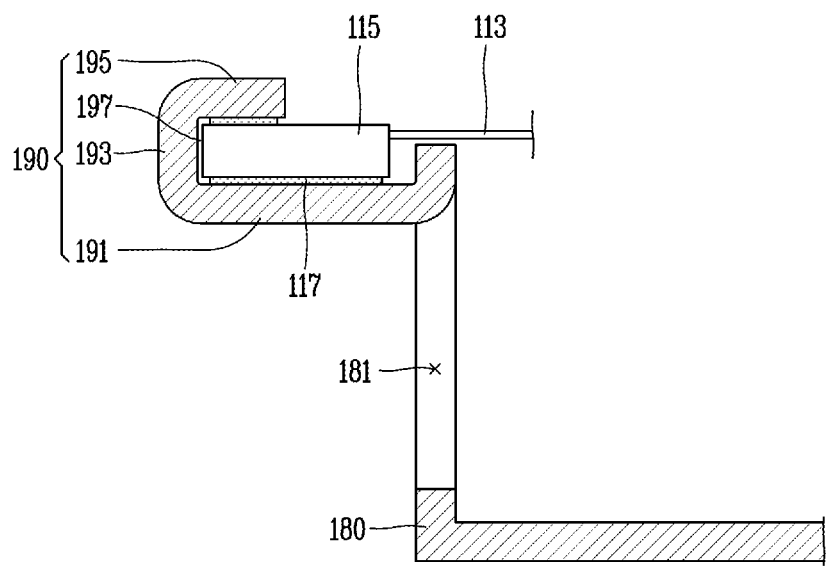
FIG. 5 is a sectional view of the cover bottom and the PCB fixing bracket taken along line A-A' in FIG. 4, which shows a PCB fixed to the PCB fixing bracket of the cover bottom.

FIG. 5 is a sectional view of the cover bottom and the PCB fixing bracket taken along line A-A' in FIG. 4, which shows a PCB fixed to the PCB fixing bracket of the cover bottom.

Figure 6:
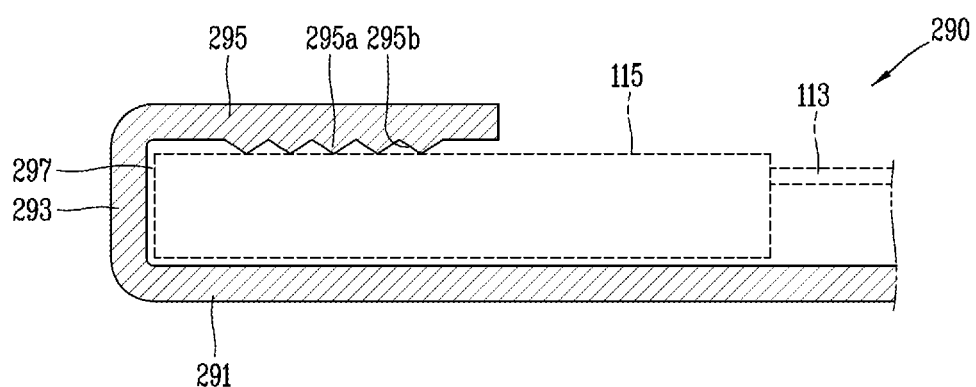
FIG. 6 is a sectional view of a PCB fixing bracket of a liquid crystal display device according to a second embodiment of the present disclosure.

FIG. 6 is a sectional view of a PCB fixing bracket of a liquid crystal display device according to another embodiment of the present disclosure.

Figure 7:
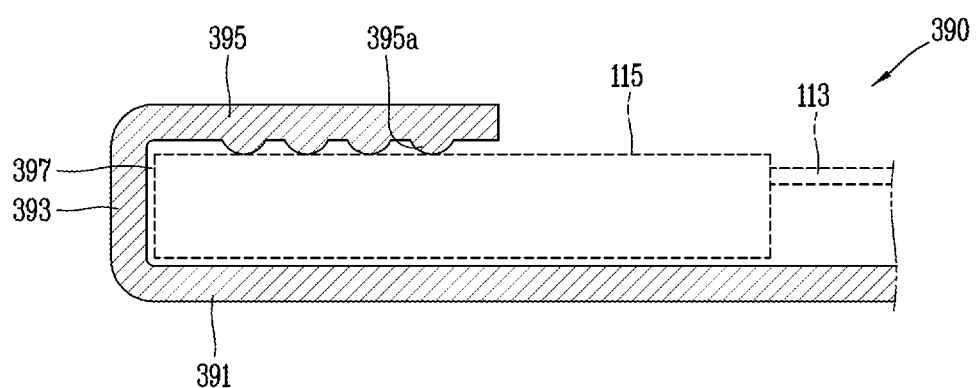
FIG. 7 is a sectional view of a PCB fixing bracket of a liquid crystal display device according to a third embodiment of the present disclosure.

FIG. 7 is a sectional view of a PCB fixing bracket of a liquid crystal display device according to another embodiment of the present disclosure.

Figure 8:
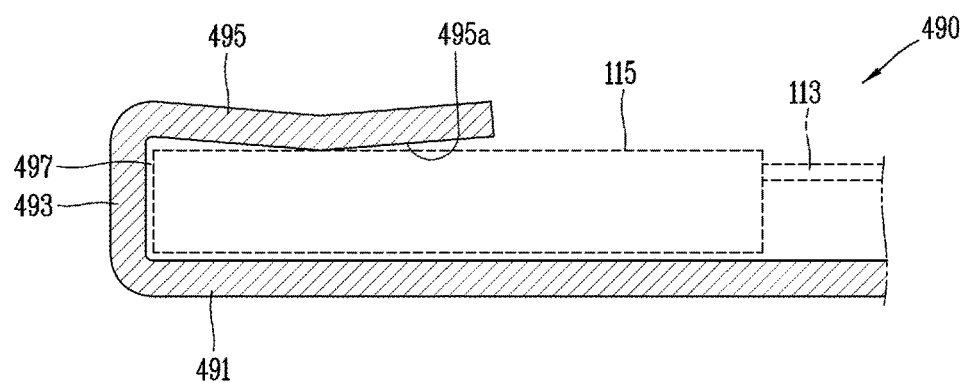
FIG. 8 is a sectional view of a PCB fixing bracket of a liquid crystal display device according to a third embodiment of the present disclosure.

FIG. 8 is a sectional view of a PCB fixing bracket of a liquid crystal display device according to another embodiment of the present disclosure.

As shown in FIGS. 1 and 2, a liquid crystal display device according to an embodiment of the present disclosure 100 includes a liquid crystal panel 110 configured to display an image, and a backlight unit 120 disposed below the LC panel 110 and configured to provide light.

As shown in FIGS. 1 and 2, the LC panel 110 includes a color filter substrate 110a and a thin film transistor (TFT) substrate 110b facing each other and attached to each other such that a uniform cell gap is maintained, and an LC layer (not shown) interposed between the two substrates. And an upper polarizing plate 111a and a lower polarizing plate 111b are attached to outer surfaces of the color filter substrate 110a and the TFT substrate 110b, respectively.

Although not shown, a plurality of gate lines and a plurality of data lines crossing each other are formed at the TFT substrate 110a, and TFTs are formed at intersections between the gate lines and the data lines.

A gate driving printed circuit board (PCB) for supplying scan signals to the gate lines, and a data driving PCB for supplying data signals to the data lines are provided at an edge of the LC panel 110. In the present disclosure, the gate driving PCB and the data driving PCB are referred to as a driving PCB 115.

The driving PCB 115 is electrically connected to the LC panel 110 through a tape carrier package (TCP) 113.

The backlight unit 120 includes a cover bottom 180 having its upper surface open, a light source unit 150 having one or more light sources 151 on an inner side surface of the cover bottom 180, a light guide plate 160 arranged in parallel to the light source unit 150 and configured to convert light incident from the light sources 151 into surface light, optical sheets 140 (shown as three optical sheets 141, 143, 145, for illustrative example) arranged on the light guide plate 160 and configured to collect and diffuse light, and a reflection sheet 170 disposed on an inner bottom surface of the cover bottom 180 and configured to reflect light emitted from the light guide plate 160 and to guide the light to the LC panel 110.

The backlight unit 120 further includes a panel guide 130 accommodated in the cover bottom 180 and configured to accommodate therein the light source unit 150, the light guide plate 160, the reflection sheet 170 and the optical sheets 140.

Although not shown, the light guide plate 160 may be formed of poly methyl methacrylate (PMMA), and may be formed in a wedge shape such that its thickness may be decreased as it becomes farther from an incident surface where the light source unit 150 is arranged. A prism pattern for refracting incident light towards the optical sheets 140 may be formed on a rear surface of the light guide plate 160.

The optical sheets 140 includes a diffusion sheet for diffusing light, a condensing sheet for condensing (collecting) light, a protection sheet for protecting the condensing sheet, etc.

The light source unit 150 includes light sources 151 formed as light emitting diodes (LED) (point light sources), and a substrate 153 where the light sources 151 are mounted such that light emitted from the light sources 151 is guided towards the light guide plate 160.

FIG. 3 is a planar view of a liquid crystal display device according to an embodiment of the present disclosure, which schematically illustrates a fixed state of the driving PCB into the PCB fixing bracket. FIG. 4 is an enlarged perspective view of a cover bottom of a liquid crystal display device according to an embodiment of the present disclosure, which shows the PCB fixing bracket provided on one side surface of the cover bottom. FIG. 5 is a sectional view of the cover bottom and the PCB fixing bracket taken along line A-A' in FIG. 4, which shows a PCB fixed to the PCB fixing bracket of the cover bottom.

As shown in FIGS. 3 to 5, a PCB fixing bracket 190 for fixing/accommodating a driving PCB 113 connected to the LC panel 110 is provided at both sides/ends, for example, of one side surface of the cover bottom 180. It should be appreciated that a single (larger) PCB fixing bracket 190 or more than two PCB fixing bracket 190 may be possible for various implementation scenarios, which are all included in the disclosure.

The PCB fixing bracket 190 is extended by protruding from a side surface of the cover bottom 180.

The PCB fixing bracket 190 includes a lower horizontal portion 191 where the driving PCB 115 is mounted, an upper horizontal portion 195 spaced apart from the lower horizontal portion 191 by a predetermined distance and facing the lower horizontal portion 191, a side surface portion 193 for connecting the lower horizontal portion 191 and the upper horizontal portion 195 to each other, and a PCB accommodating portion 197 having a '⊏' shape and disposed among (or defined by) the lower horizontal portion 191, the upper horizontal portion 195 and the side surface portion 193.

As shown in FIGS. 4 and 5, the PCB fixing bracket 190 has a structure where cut-out portions formed at both sides of one side surface of the cover bottom 180 protrude outward to be bent, and the PCB accommodating portion 197 is provided at one end of the bent part. Here, the PCB fixing bracket 190 is integrally formed with the cover bottom 180.

Cut-out portions 181 are formed at, for example, both sides/ends of one side surface of the cover bottom 180. Especially, the cut-out portions 181 may be formed as the PCB fixing brackets 190 protrude from one side surface of the cover bottom 180.

As shown in FIG. 5, the driving PCB 115 is fitted into the PCB accommodating portion 197 of the PCB fixing bracket 190.

Since the driving PCB 115 is insertion-fixed to the '⊏'-shaped PCB accommodating portion 197 of the PCB fixing bracket 190, an additional structure to fix a PCB, e.g., the conventional screws or fixing tape may not be used.

Further, since the driving PCB 115 can move in the PCB accommodating portion 197 of the PCB fixing bracket 190, problems such as a line defect or separation of the fixing tape, occurring due to the conventional screws or fixing tape, may be prevented.

As shown in FIG. 5, a PCB ground region 117 is formed, for example, on an upper surface and a lower surface of the driving PCB 115 which contact the lower horizontal portion 191 and the upper horizontal portion 195 which constitute the PCB accommodating portion 197. Especially, the PCB ground region 117 may be selected from metallic materials including gold (Au). It should be appreciated that it is possible that a PCB ground region 117 is formed on one of the upper surface and the lower surface of the driving PCB 115, which are all included in the disclosure.

Since the PCB ground region 117 is formed on the upper surface and the lower surface of the driving PCB 115 which contact the PCB fixing bracket 190, the PCB ground region 117 is increased than the conventional one. This may allow stability with respect to inferior external static electricity to be obtained. That is, as static electricity (ESD) flows out to the cover bottom 180 through the PCB fixing bracket 190 by the PCB ground region 117, the stability with respect to inferior external static electricity is obtained.

Hereinafter, other embodiments of the PCB fixing bracket of the LCD device according to the present disclosure will be explained with reference to FIGS. 6 to 8.

FIG. 6 is a sectional view of a PCB fixing bracket of a liquid crystal display device according to another embodiment of the present disclosure.

As shown in FIG. 6, a PCB fixing bracket 290 of a liquid crystal display device according to another embodiment of the present disclosure is extended by protruding from a side surface of a cover bottom (not shown, refer to 180 of FIG. 5).

The PCB fixing bracket 290 includes a lower horizontal portion 291 where a driving PCB (not shown, refer to 115 of FIG. 1) is mounted, an upper horizontal portion 295 spaced apart from the lower horizontal portion 291 by a predetermined distance and facing the lower horizontal portion 291, a side surface portion 293 for connecting the lower horizontal portion 291 and the upper horizontal portion 295 to each other, and a PCB accommodating portion 297 having a '⊏' shape and disposed among the lower horizontal portion 291, the upper horizontal portion 295 and the side surface portion 293.

A plurality of embossed/convex portions 295a and concave portions 295b for fixing the driving PCB 115 connected to an LC panel (not shown) by the TCP 113, in an inserted state, are provided on an inner side surface of the upper horizontal portion 295.

In this case, similar to one embodiment of the present disclosure, in an inserted state of the driving PCB 115 into the '⊏'-shaped PCB accommodating portion 297 of the PCB fixing bracket 290, the plurality of convex portions 295a provided on the inner side surface of the upper horizontal portion 295 contact an upper surface of the driving PCB 115, thereby pressing and fixing the driving PCB 115. Accordingly, an additional structure to fix a PCB, e.g., the conventional screws or fixing tape may not be used.

Further, since the driving PCB 115 can move in the PCB accommodating portion 297 of the PCB fixing bracket 290, problems such as a line defect or separation of the fixing tape, occurring due to the conventional screws or fixing tape, may be prevented.

Although not shown, a PCB ground region (not shown) may be formed on an upper surface and a lower surface of the driving PCB 115 which contact the lower horizontal portion 291 and the upper horizontal portion 295 which constitute the PCB accommodating portion 297. Especially, the PCB ground region (not shown) may be selected from metallic materials including gold (Au).

Since the PCB ground region (not shown) is formed on the upper surface and the lower surface of the driving PCB 115 which contact the PCB fixing bracket 290, the PCB ground region (not shown) is more increased than the conventional one. This may allow stability with respect to inferior external static electricity to be obtained. That is, as static electricity (ESD) flows out to a cover bottom (not shown, refer to 180 of FIG. 5) through the PCB fixing bracket 290 by the PCB ground region (not shown), the stability with respect to inferior external static electricity is obtained.

FIG. 7 is a sectional view of a PCB fixing bracket of a liquid crystal display device according to another embodiment of the present disclosure.

As shown in FIG. 7, a PCB fixing bracket 390 of a liquid crystal display device according to another embodiment of the present disclosure is extended by protruding from a side surface of a cover bottom (not shown, refer to 180 of FIG. 5).

The PCB fixing bracket 390 includes a lower horizontal portion 391 where a driving PCB (not shown, refer to 115 of FIG. 1) is mounted, an upper horizontal portion 395 spaced apart from the lower horizontal portion 391 by a predetermined distance and facing the lower horizontal portion 391, a side surface portion 393 for connecting the lower horizontal portion 391 and the upper horizontal portion 395 to each other, and a PCB accommodating portion 397 having a '⊏' shape and disposed among the lower horizontal portion 391, the upper horizontal portion 395 and the side surface portion 393.

A plurality of embossed/convex portions 395a (with a slightly different profile than the ones shown in FIG. 6) for fixing the driving PCB 115 connected to an LC panel (not shown) by the TCP 113, in an inserted state, are provided on an inner side surface of the upper horizontal portion 395.

In this case, similar to one embodiment of the present disclosure, in an inserted state of the driving PCB 115 into the '⊏'-shaped PCB accommodating portion 397 of the PCB fixing bracket 390, the plurality of embossed portions 395a provided on the inner side surface of the upper horizontal portion 395 press and fix an upper surface of the driving PCB 115. Accordingly, an additional structure to fix the PCB, e.g., the conventional screws or fixing tape may not be used.

Further, since the driving PCB 115 can move in the PCB accommodating portion 397 of the PCB fixing bracket 390, problems such as a line defect or separation of the fixing tape, occurring due to the conventional screws or fixing tape, may be prevented.

Although not shown, a PCB ground region (not shown) may be formed on an upper surface and a lower surface of the driving PCB 115 which contact the lower horizontal portion 391 and the upper horizontal portion 395 which constitute the PCB accommodating portion 397. Especially, the PCB ground region (not shown) may be selected from metallic materials including gold (Au).

Since the PCB ground region (not shown) is formed on the upper surface and the lower surface of the driving PCB 115 which contact the PCB fixing bracket 390, the PCB ground region (not shown) is more increased than the conventional one. This may allow stability with respect to inferior external static electricity to be obtained. That is, as static electricity (ESD) flows out to a cover bottom (not shown, refer to 180 of FIG. 5) through the PCB fixing bracket 390 by the PCB ground region (not shown), the stability with respect to inferior external static electricity is obtained.

It should be appreciated that embossed/convex portions of other profiles than those illustrated, as examples, in FIGS. 6 and 7 are also possible and included in the disclosure.

FIG. 8 is a sectional view of a PCB fixing bracket of a liquid crystal display device according to another embodiment of the present disclosure.

As shown in FIG. 8, a PCB fixing bracket 490 of a liquid crystal display device according to another embodiment of the present disclosure is extended by protruding from a side surface of a cover bottom (not shown, refer to 180 of FIG. 5).

The PCB fixing bracket 490 includes a lower horizontal portion 491 where a driving PCB (not shown, refer to 115 of FIG. 1) is mounted, an upper horizontal portion 495 spaced apart from the lower horizontal portion 491 by a predetermined distance and facing the lower horizontal portion 491, a side surface portion 493 for connecting the lower horizontal portion 491 and the upper horizontal portion 495 to each other, and a PCB accommodating portion 497 having a '⊏' shape and disposed among the lower horizontal portion 491, the upper horizontal portion 495 and the side surface portion 493.

A clip structure 495a for fixing the driving PCB 115 connected to an LC panel (not shown) by the TCP 113, in an inserted state, is provided on an inner side surface of the upper horizontal portion 495.

In this case, similar to one embodiment of the present disclosure, in an inserted state of the driving PCB 115 into the '⊏'-shaped PCB accommodating portion 497 of the PCB fixing bracket 490, the clip structure 495a provided on the inner side surface of the upper horizontal portion 495 presses to fix an upper surface of the driving PCB 115 with a predetermined force. Accordingly, an additional structure to fix the PCB, e.g., the conventional screws or fixing tape may not be used.

Further, since the driving PCB 115 can move in the PCB accommodating portion 497 of the PCB fixing bracket 490, problems such as a line defect or separation of the fixing tape, occurring due to the conventional screws or fixing tape, may be prevented.

Although not shown, a PCB ground region (not shown) may be formed on an upper surface and a lower surface of the driving PCB 115 which contact the lower horizontal portion 491 and the upper horizontal portion 495 which constitute the PCB accommodating portion 497. Especially, the PCB ground region (not shown) may be selected from metallic materials including gold (Au).

Since the PCB ground region (not shown) is formed on the upper surface and the lower surface of the driving PCB 115 which contact the PCB fixing bracket 490, the PCB ground region (not shown) is more increased than the conventional one. This may allow stability with respect to inferior external static electricity to be obtained. That is, as static electricity (ESD) flows out to a cover bottom (not shown, refer to 180 of FIG. 5) through the PCB fixing bracket 490 by the PCB ground region (not shown), the stability with respect to inferior external static electricity is obtained.

Hereinafter, a liquid crystal display device according to a fourth embodiment of the present disclosure will be explained in more detail with reference to the attached drawings.

Figure 9:
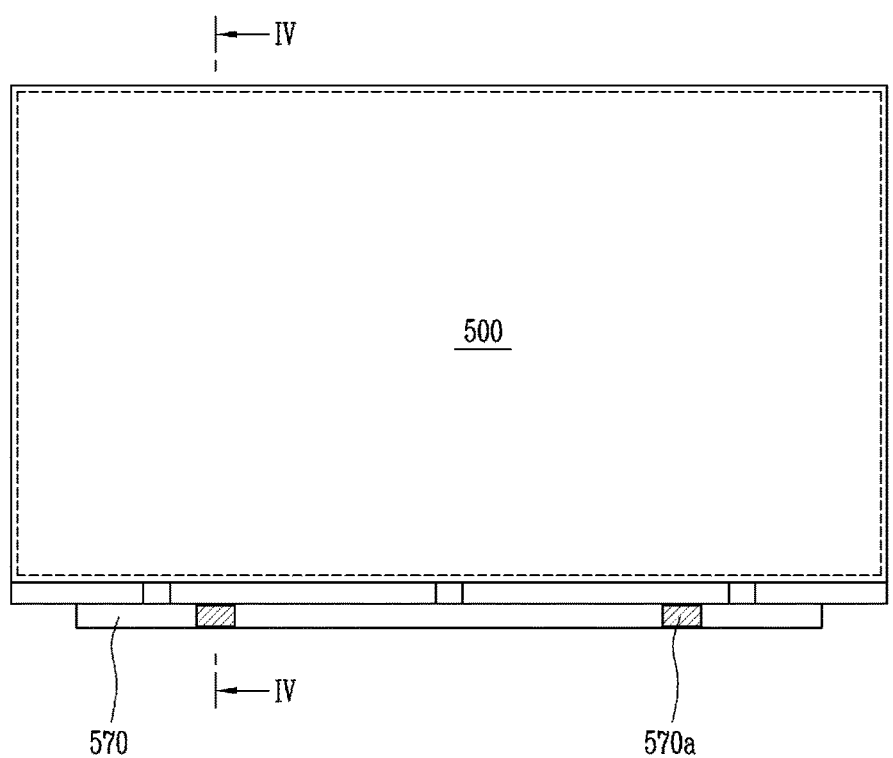
FIG. 9 is a planar view schematically showing a liquid crystal display device according to a fourth embodiment of the present disclosure.

FIG. 9 is a planar view schematically showing a liquid crystal display device according to a fourth embodiment of the present disclosure. And FIG. 10 is a partial enlarged planar view of a liquid crystal display device according to a fourth embodiment of the present disclosure, which shows a ground region of a source PCB and a cover shield in an enlarged manner.

Figure 10:
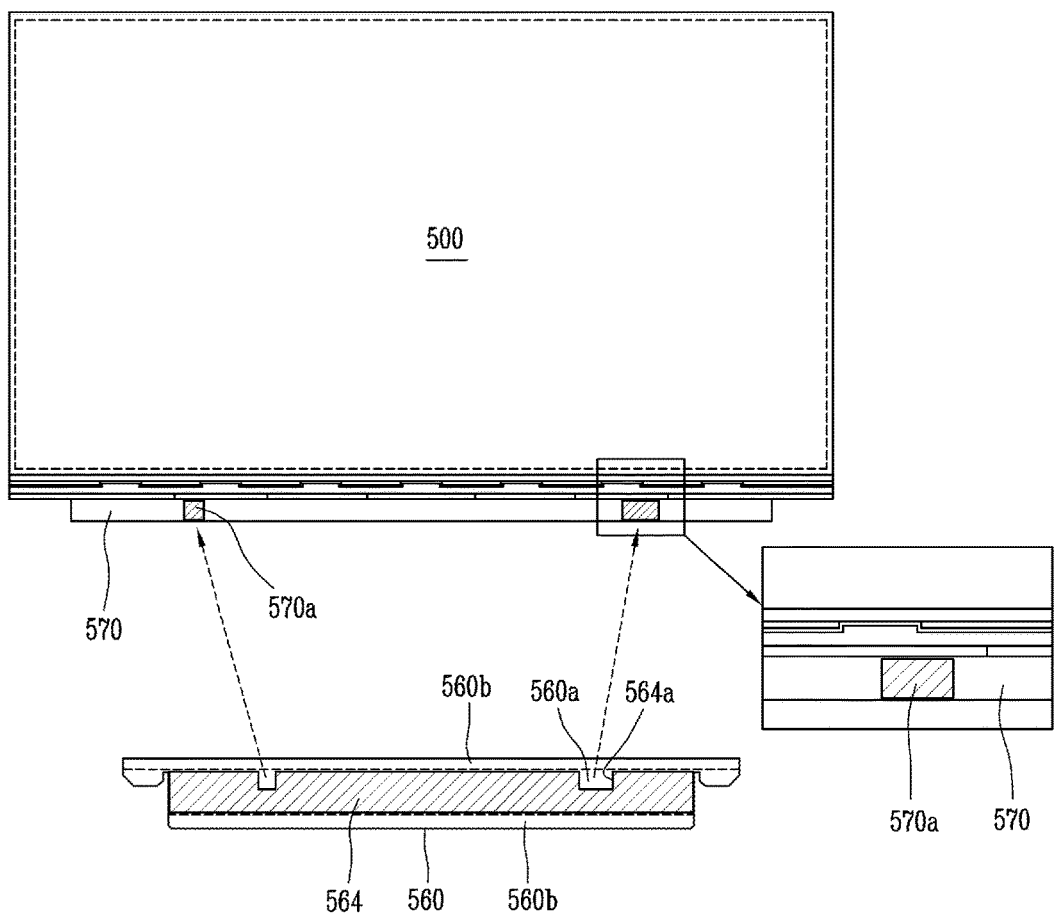
FIG. 10 is a partial enlarged planar view of a liquid crystal display device according to a fourth embodiment of the present disclosure, which shows a ground region of a source PCB and a cover shield in an enlarged manner.

Referring to FIGS. 9 and 10, the liquid crystal display device according to a fourth embodiment of the present disclosure largely includes a liquid crystal panel 510 for outputting an image by injecting a liquid crystal into a space between a color filter substrate 512 and an array substrate 514, a driving circuit unit including a source printed circuit board (PCB) 570 electrically connected to the LC panel 510, a backlight unit installed on a rear surface of the LC panel 510 and configured to emit light onto an entire surface of the LC panel 510, and a support main (not shown) and a cover bottom 550 for fixing the LC panel 510 and the backlight unit in a coupling manner.

The source PCB 570 is electrically connected to the array substrate 514 through a chip on film (COF) (not shown). A protection layer 572 for preventing a short circuit among driving circuits (not shown) is thinly formed on an upper surface of the source PCB 570.

Figure 11:
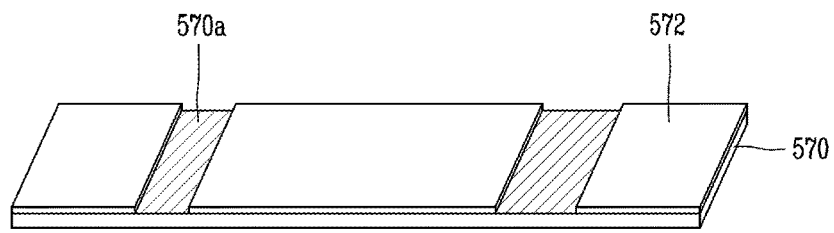
FIG. 11 is a view schematically showing a source PCB of a liquid crystal display device according to a fourth embodiment of the present disclosure, which shows a ground region provided on an upper surface of the source PCB.

FIG. 11 is a view schematically showing a source PCB of a liquid crystal display device according to a fourth embodiment of the present disclosure, which shows a ground region provided on an upper surface of the source PCB.

As shown in FIG. 11, a ground region 570a is formed on the source PCB 570 as a part of the source PCB 570 is exposed to the outside when a part of the protection layer 572 is removed. Here, the ground region 570a may be formed on the protection layer 572 in at least one in number. As will be explained later, as the ground region 570a is electrically connected to a ground region contact portion 560a which is on an inner surface of a cover shield 560, the PCB 570 is grounded.

Figure 12:
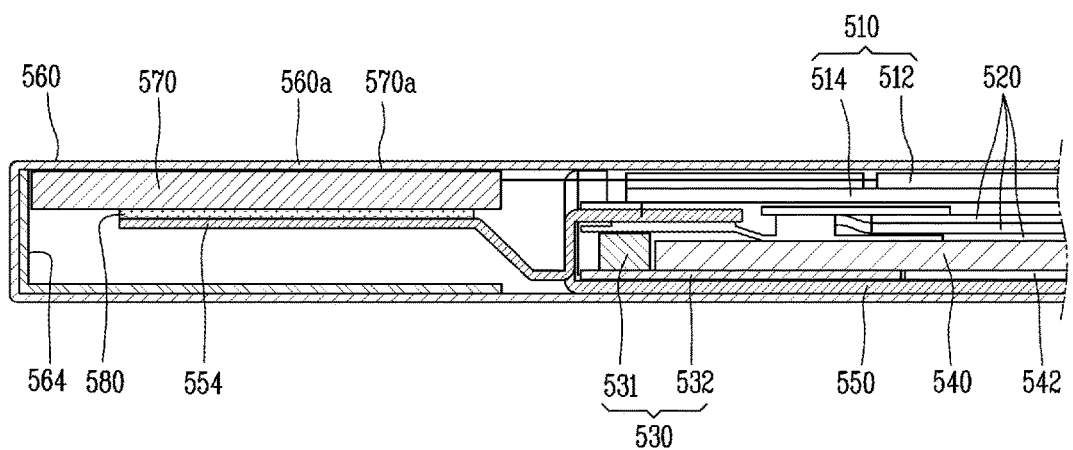
FIG. 12 is a sectional view schematically showing a liquid crystal display device according to a fourth embodiment of the present disclosure.

FIG. 12 is a sectional view schematically showing a liquid crystal display device according to a fourth embodiment of the present disclosure.

Figure 13:
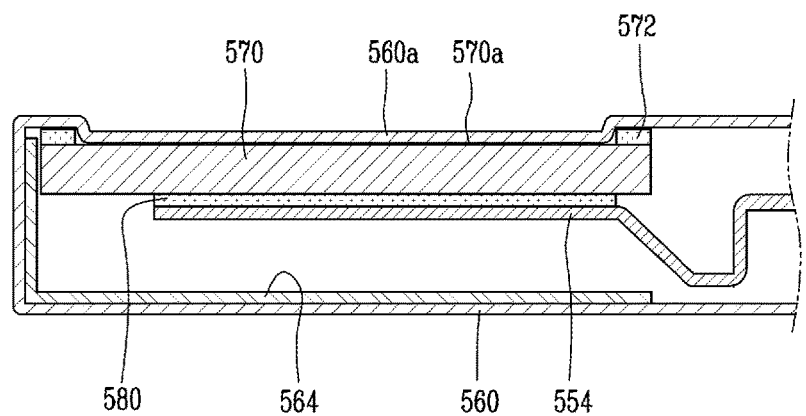
FIG. 13 is an enlarged sectional view of a cover shield which contacts a source PCB connected to a liquid crystal display device according to a fourth embodiment of the present disclosure.

FIG. 13 is an enlarged sectional view of a cover shield which contacts a source PCB connected to a liquid crystal display device according to a fourth embodiment of the present disclosure As shown in FIGS. 12 and 13, a part of a side surface of the cover bottom 550 extends outward, thereby constituting a PCB bracket 554. The PCB bracket 554 is formed as a cut-out portion of a side surface of the cover bottom 550 extends outward.

The liquid crystal display device according to a fourth embodiment of the present disclosure adopts the flat-type source PCB 570 for slimness of a product, and the flat-type source PCB 570 is applicable not only to a notebook PC, but also to a desktop monitor and a television.

Polarizing plates (not shown) are provided outside the color filter substrate 512 and the array substrate 514. And the backlight unit (not shown) includes a light source 531 for irradiating light by receiving power from an external power source, a light guiding plate 540 for moving light incident through a side surface which faces the light source 531 toward the LC panel 510, a reflection sheet 542 disposed on a rear surface of the light guiding plate 540, and a plurality of optical sheets 520 disposed on an upper surface of the light guiding plate 540 and configured to irradiate light emitted from the light guiding plate 140 to the LC panel 510 after enhancing efficiency of the light.

However, the present disclosure is not limited to the aforementioned structure of the backlight unit. That is, a backlight unit of any structure may be applicable to the LCD device according to an embodiment of the present disclosure.

As the light source 531, may be used a tube-type cold cathode fluorescence lamp (CCFL) having a length corresponding to a distance between long edges of the LC panel 510 or a distance between short edges of the LC panel 510. However, a light emitting diode (LED) requiring no additional inverter and having a longer lifespan than the CCFL may be used. The light source 531 formed as an LED array, and an LED PCB 532 for driving the light source 531 constitute a light source array 530. An LED housing (not shown) is provided above the light source 531, thereby reflecting backlight which is towards a non-display region, to the light guiding plate 540.

Light generated from the light source 531 is incident onto a side surface of the light guiding plate 540 formed of a transparent material. And the reflection sheet 542 disposed on a rear surface of the light guiding plate 540 reflects light transmitted to the rear surface of the light guiding plate 540, towards the optical sheets 520 which are on an upper surface of the light guiding plate 540, thereby reducing an optical loss and enhancing uniformity. The optical sheets 520 include a diffuser sheet and upper and lower prism sheets, and may further include a protection sheet.

The LC panel 510 composed of the color filter substrate 512 and the array substrate 514 is mounted on an upper part of the backlight unit through a support main (not shown), and the cover bottom 550 is coupled to a lower part of the backlight unit, thereby constituting an LCD device. A plurality of double-sided tapes 521, 522 may be used for the coupling. Edges of the LCD device, i.e., edges of the support main (not shown) and edges of the cover bottom 550 are fixed in a state that upper, lower and side surfaces of the support main and the cover bottom are partially covered by one-sided tape (not shown).

Although not shown, a common electrode and a pixel electrode are formed at the LC panel 510 formed as the color filter substrate 512 and the array substrate 514 are attached to each other, thereby applying an electric field to an LC layer. If a voltage of a data signal applied to the pixel electrode is controlled in a state that a voltage has been applied to the common electrode, liquid crystals of the LC layer are rotated by dielectric anisotropy according to an electric field between the common electrode and the pixel electrode, thereby displaying a text or an image by transmitting or shielding light according to each pixel.

The LCD device according to a fourth embodiment of the present disclosure is applied to an FHD model having a resolution of 1920×1080. However, the present disclosure is not limited to this. In the case, since a driving current value is large, inferior wrinkles may occur due to radiation from a light incidence portion of the light guiding plate 540. In case of the FHD model, a surface temperature of the light incidence portion was measured to be higher than that of an HD model by 4° C. on average. Such a high temperature may cause the light guiding plate 540 to be bent partially.

However, in the fourth embodiment of the present disclosure, the cover shield 160 for protecting the source PCB 170 is formed of a thermal conductive metallic material such as aluminum, thereby emitting heat to the outside. This can allow the aforementioned inferior wrinkles to be solved.

Further, the cover shield 560 is bent to cover from an upper surface of the color filter substrate 512 to a lower surface of the cover bottom 550, in order to sufficiently cover an upper surface, a lower surface and side surfaces of the source PCB 570, thereby being attached to the LC panel 510 and the cover bottom 550.

An insulating sheet 564 is attached to an inner surface of the cover shield 560, for insulation from a circuit device of the source PCB 570, etc. The insulating sheet 564 is attached to a central region of an inner surface of the cover shield 560, and a conductive adhesion portion 560*b* (refer to FIG. 10) is provided on an inner surface of the cover shield 560 which is disposed at upper and lower sides of the insulating sheet 564.

The cover shield 560 may be formed of any one of conductive materials including aluminum (Al).

The conductive adhesion portion 560*b* provided at upper and lower sides of the cover shield 560 is attached to a part of an upper surface of the color filter substrate 512 of the LC panel 510, and a part of a lower surface of the cover bottom 550.

An adhesive for attaching the insulating sheet 564 is disposed on an inner surface of the cover shield 560, and the insulating sheet 564 may be formed of plastic such as polyethylene terephthalate.

A contact hole 564*a* (refer to FIG. 10) for forming a ground region contact portion 560*a* on an inner surface of the cover shield 560 is formed at the insulating sheet 564.

As a part 564*a* of the insulating sheet 564 is removed, the ground region contact portion 560*a* is formed at the cover shield 560 disposed below the part 564*a* to thus be exposed to the outside. When the cover shield 560 is bent to cover from an upper surface of the LC panel 510 to a lower surface of the cover bottom 550 in order to cover an upper surface, a lower surface and side surfaces of the source PCB 570, the ground region contact portion 560*a* of the cover shield 560 contacts a ground region 570*a* provided on an upper surface of the source PCB 570 to perform a grounding function.

Especially, as shown in FIGS. 12 and 13, the ground region contact portion 560*a* provided on an upper side of an inner surface of the cover shield 560 contacts the ground region 570*a* formed as a part of the protection layer 172 provided on an upper surface of the source PCB 570 is removed, thereby being electrically connected thereto.

A bent portion formed on an inner surface of the cover shield 560 encloses a side surface of the source PCB 570, and the conductive adhesion portion 560*b* provided at upper and lower sides of an inner surface of the cover shield 560 is attached to an upper surface of the LC panel 510 and a lower surface of the cover bottom 550.

A non-conductive adhesion tape 580 having a high viscosity is interposed between the source PCB 570 and the PCB bracket 554. As the source PCB 570 is attached to the PCB bracket 554 by the non-conductive adhesion tape 580 having a high viscosity, a fixing force of the source PCB 570 may be intensified.

Hereinafter, a method for fabricating a liquid crystal display device according to a fourth embodiment of the present disclosure will be explained in more detail with reference to FIGS. 14 and 15.

Figure 14:
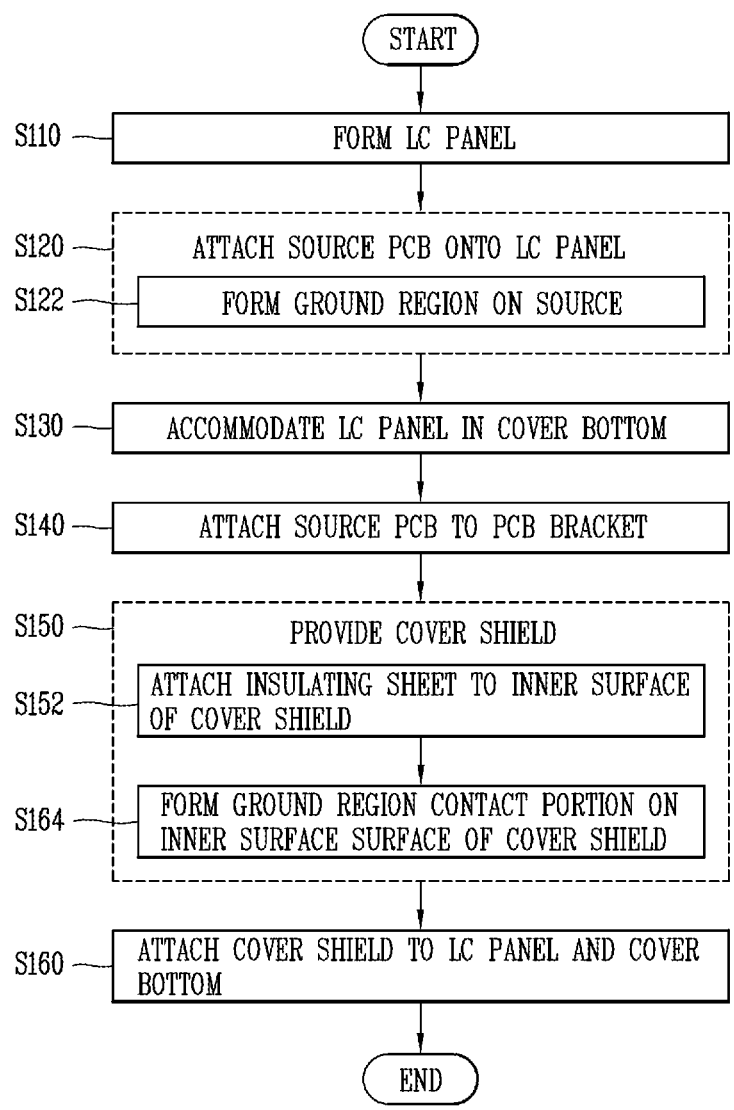
FIG. 14 is a flowchart showing a method for fabricating a liquid crystal display device according to a fourth embodiment of the present disclosure.

FIG. 14 is a flowchart showing a method for fabricating a liquid crystal display device according to a fourth embodiment of the present disclosure, and FIGS. 15A to 15D are sectional views showing fabrication processes of a liquid crystal display device according to a fourth embodiment of the present disclosure.

Referring to FIG. 14, the method for fabricating a liquid crystal display device according to a fourth embodiment of the present disclosure includes a first step of forming a liquid crystal panel (S110), a second step of attaching a source PCB to the LC panel (S120), a third step of accommodating the LC panel in a cover bottom (S130), a fourth step of attaching the source PCB onto an upper surface of a PCB bracket (S140), a fifth step of providing a cover shield attached to the source PCB and the cover bottom (S150), and a sixth step of attaching the cover shield to the LC panel and the cover bottom (S160).

The second step of attaching a source PCB to the LC panel (S120) includes forming a ground region at the source PCB by removing a part of an insulating layer formed on an upper surface of the source PCB (S122).

The sixth step of attaching the cover shield to the LC panel and the cover bottom (S160) includes attaching an insulating sheet to an inner surface of the cover shield (S152), and forming a ground region contact portion at an inner surface of the cover shield (S154).

Figure 15A:
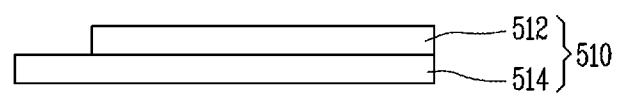
FIGS. 15A to 15D are sectional views showing fabrication processes of a liquid crystal display device according to a fourth embodiment of the present disclosure.

Referring to FIGS. 14 and 15A, in the first step (S110), fabrication processes of an LC panel may largely include a driving device array process for forming a driving device on a lower array substrate, a color filter process for forming a color filter on an upper color filter substrate, and a cell process.

Through the array process, a plurality of gate lines and data lines which define pixel regions on the array substrate are formed, and thin film transistors (TFTs) (driving devices) connected to the gate lines and the data lines are formed at the pixel regions. Further, through the array process, formed are pixel electrodes connected to the TFTs and configured to drive an LC layer as a signal is applied through the TFTs.

Then, through the color filter process, a color filter layer composed of RGB sub color filters for implementing colors, and a common electrode are formed. In case of fabricating an In Plane Switching (IPS)-type LCD device, the common electrode is formed on the array substrate where the pixel electrodes are formed through the array process.

Then, an alignment layer is printed on each of the color filter substrate 512 and the array substrate 514, and the alignment layer is rubbed in order to provide an alignment restriction force or a surface fixing force (i.e., a pretilt angle and an alignment direction) to LC molecules of an LC layer (not shown) formed between the color filter substrate 512 and the array substrate 514.

A sealant (not shown) is applied onto the color filter substrate 512 which has undergone a rubbing process, thereby forming a predetermined seal pattern. And liquid crystals are dropped onto the array substrate to form an LC layer (not shown).

Each of the color filter substrate 512 and the array substrate 514 is formed on a mother substrate of a large area. That is, a plurality of panel regions are formed on each mother substrate of a large area, and a thin film transistor (TFT, a driving device) or a color filter layer is formed at each of the panel regions.

The dropping method is a method of forming an LC layer by dropping and dispensing liquid crystals, by using a dispenser, onto an image display region of a first mother substrate of a large area where a plurality of array substrates are arranged, or a second mother substrate where a plurality of color filter substrates are arranged, and by uniformly distributing the liquid crystals to the entire image display region by a pressure to attach the first and second mother substrates to each other.

Accordingly, in case of forming an LC layer on the LC panel by a dropping method, a seal pattern should be formed as a closed pattern which encloses an outer periphery of a pixel region, in order to prevent liquid crystals from leaking to the outside of the image display region.

Then, in a state that the first and second mother substrates on which the liquid crystals have been dropped and the sealant has been applied are aligned with each other, the first and second mother substrates are attached to each other by the sealant. And the dropped liquid crystals are uniformly distributed onto the entire LC panel by a pressure.

Through the above processes, a plurality of LC panels having an LC layer are formed on the first and second mother substrates of a large area. Then, the plurality of LC panels are processed and cut to be separated from each other.

Figure 15B:
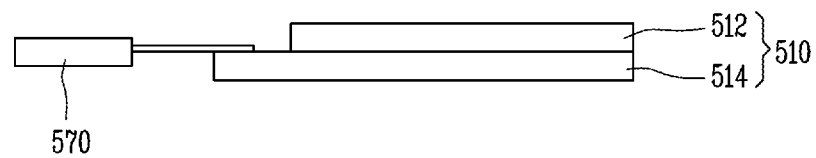

Referring to FIGS. 14 and 15B, in the second step (S120), a series of cell processes are performed after the unit LC panels are fabricated. As one of the cell processes, a driving circuit unit including a source PCB (not shown, refer to 570 of FIG. 10) is attached to an LC panel (not shown, refer to 510 of FIG. 10). Here, the source PCB 570 is attached to the array substrate 514 of the LC panel 510 through a chip on film (COF).

Figure 15C:
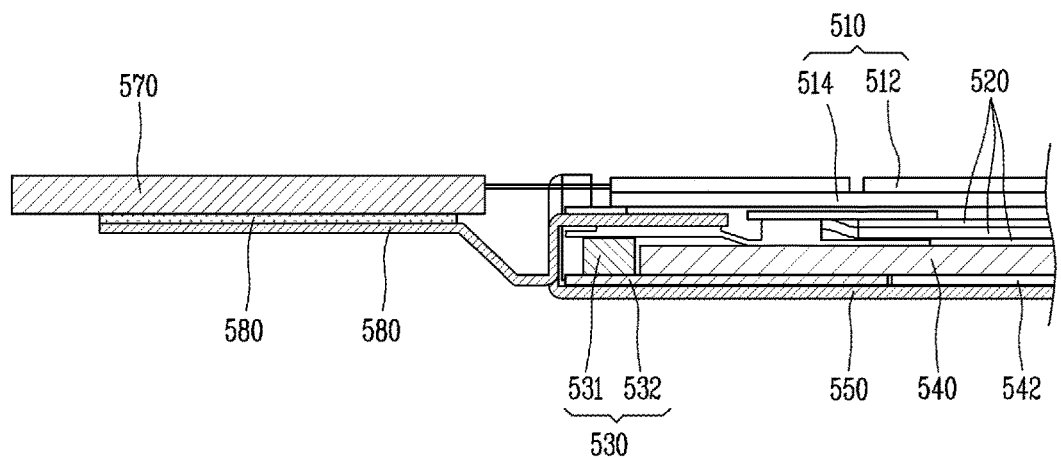

Referring to FIGS. 14 and 15C, in the third step (S130), in a state that a backlight unit composed of an LED array 530, a light guiding plate 540, a reflection sheet 542 and a plurality of optical sheets 520 is arranged on a rear surface of the LC panel 510, the LC panel 510 and the backlight unit are accommodated in the cover bottom 550.

Then, in the fourth step (S140), the source PCB 570 is arranged on an upper surface of the PCB bracket 554 formed as a part of a side surface of the cover bottom 550 is cut and the cut part extended outward. An opening (not shown) is formed at the cut part of the side surface of the cover bottom 550. Since the opening (not shown) has a smaller size than the conventional one, exposure of the LED array 530 to the outside through the opening (not shown) is prevented. Accordingly, a hot spot due to exposure of the LED can be prevented.

Further, an adhesive tape 580 having a high viscosity is disposed between the PCB bracket 554 and the source PCB 570, thereby enhancing a fixing force of the source PCB 570. Since the non-conductive adhesion tape 580 has a high viscosity even if it has a small area, it is interposed between the PCB bracket 554 and the source PCB 570 to enhance a fixing force of the source PCB 570.

Figure 15D:
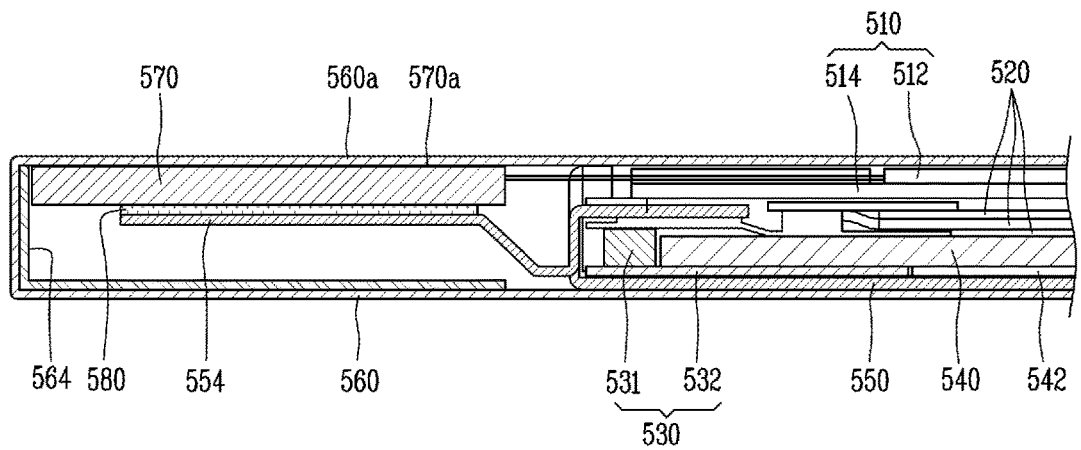

Referring to FIGS. 14 and 15D, in the fifth step (S150), the cover shield 560 is attached to the LC panel 510. For this, the cover shield 560 according to this embodiment of the present disclosure is provided. For this, a cover shield base film formed of a thermal conductive metallic material such as aluminum is provided, and then an insulating sheet 564 is attached onto an inner surface of the base film (S152). The insulating sheet 564 may be formed of plastic such as polyethylene terephthalate. Before attaching the insulating sheet 564, an adhesive is applied onto the inner surface of the base film.

Then, a part 564a of the insulating sheet 564 attached onto the inner surface of the cover shied 560 is removed, thereby forming a ground region contact portion (not shown, refer to 560a of FIG. 11) (S154). Here, the ground region contact portion 560a is exposed to the outside.

Then, in the sixth step (S160), the cover shield 560 is attached to an upper part of the LC panel 510, i.e., an outer side of the color filter substrate 512 and the cover bottom 550. The cover shield 560 is bent to cover from an upper surface of the color filter substrate 512 to a lower surface of the cover bottom 550, in order to sufficiently cover an upper surface, a lower surface and side surfaces of the source PCB 570, thereby being attached to the LC panel 510 and the cover bottom 550.

The ground region contact portion 560a provided on the inner surface of the cover shield 560 contacts the ground region 570a of the source PCB 570, thereby being electrically connected thereto.

As aforementioned, in the LCD device of the present disclosure, since the ground region provided on the source PCB contacts the ground region contact portion provided at the cover shield, a ground function for the source PCB may be enhanced.

Further, since the non-conductive adhesion tape having a high viscosity has a small area, the size of the opening cut-out on the side surface of the cover bottom in order to form the PCB bracket is also reduced. This may prevent a hot spot due to exposure of the LED through the opening.

Further, in the present disclosure, since the non-conductive adhesion tape having a high viscosity is used, a fixing force of the source PCB may be enhanced.

Figure 16:
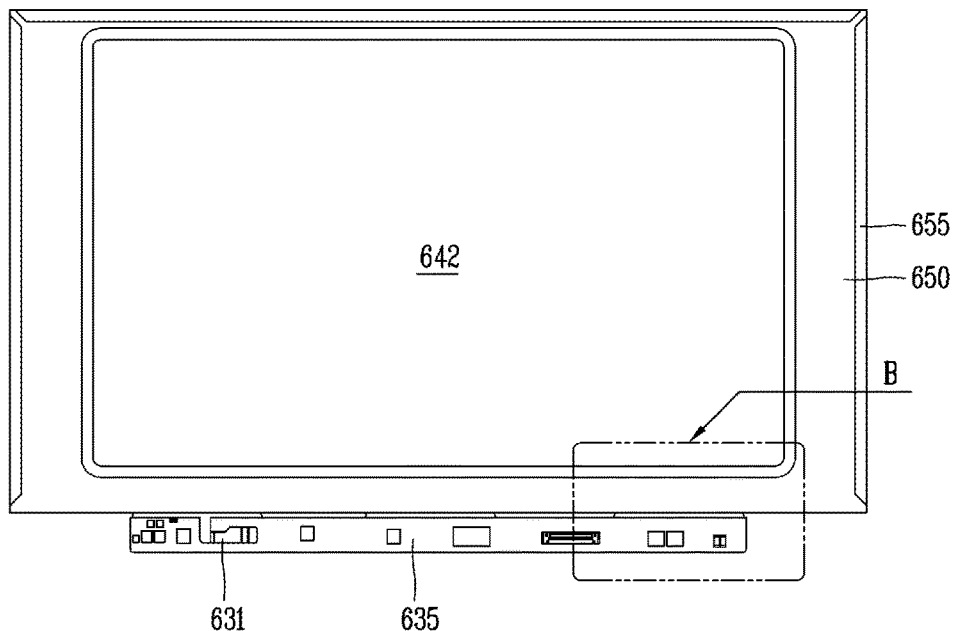
FIG. 16 is a rear view schematically showing a structure of a liquid crystal display device according to a fifth embodiment of the present disclosure.

FIG. 16 is a rear view schematically showing a structure of a liquid crystal display device according to a fifth embodiment of the present disclosure.

Figure 17:
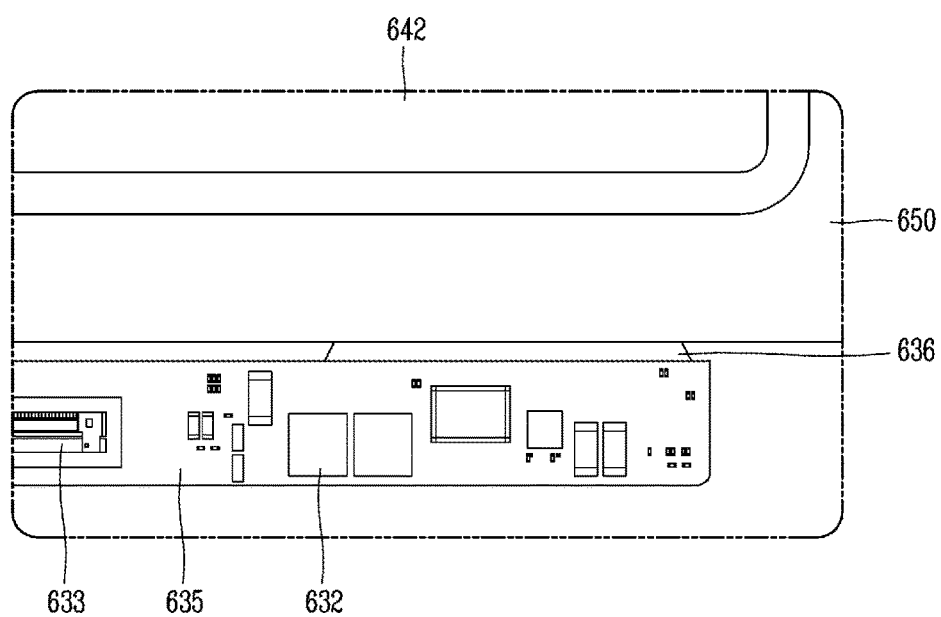
FIG. 17 is an enlarged view of part 'B' in the liquid crystal display device according to a fifth embodiment of the present disclosure shown in FIG. 16.

FIG. 17 is an enlarged view of part CB' in the liquid crystal display device according to a fifth embodiment of the present disclosure shown in FIG. 16.

Figure 18:
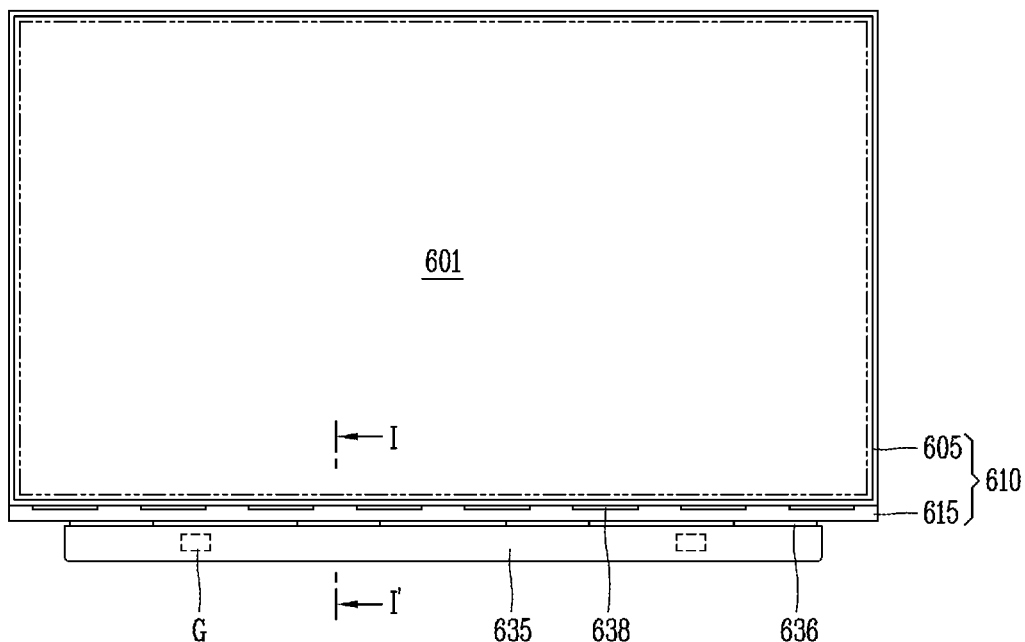
FIG. 18 is a planar view schematically showing a structure of a liquid crystal panel assembly according to a fifth embodiment of the present disclosure.
Figure 19:
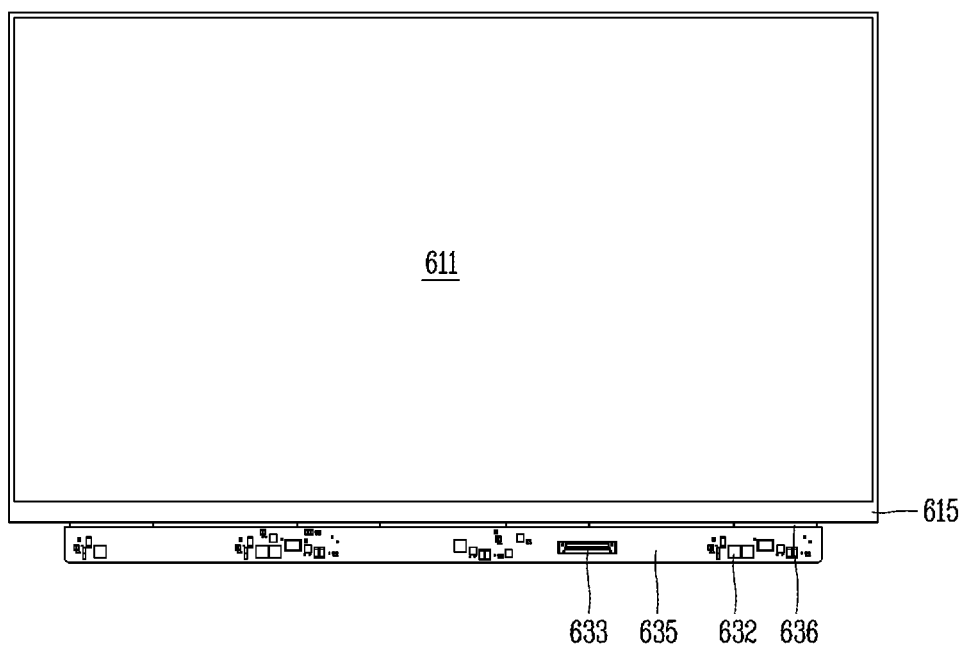
FIG. 19 is a rear view schematically showing a structure of the liquid crystal panel assembly according to a fifth embodiment of the present disclosure.

FIG. 18 is a planar view schematically showing a structure of a liquid crystal panel assembly according to a fifth embodiment of the present disclosure. FIG. 19 is a rear view schematically showing a structure of the liquid crystal panel assembly according to a fifth embodiment of the present disclosure. It is assumed that the liquid crystal panel assembly includes an LC panel and a driving circuit of an LCD device, except for a backlight unit.

Figure 20:
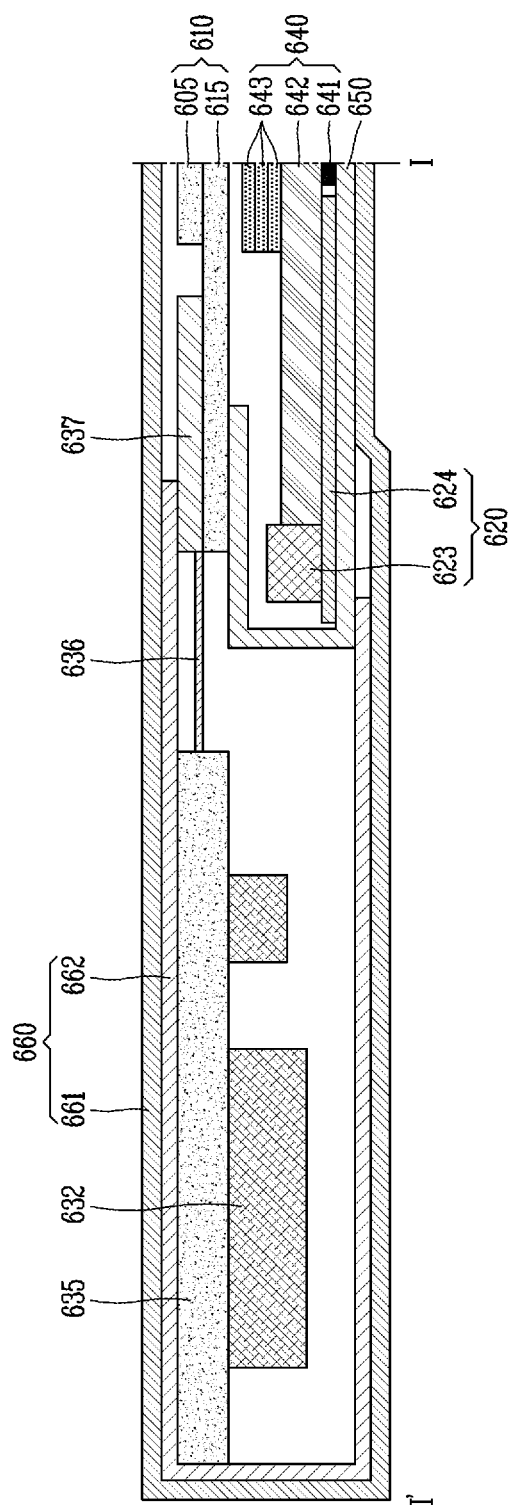
FIG. 20 is a sectional view taken along line 'I-I' in the liquid crystal display device according to a fifth embodiment of the present disclosure shown in FIG. 18.

FIG. 20 is a sectional view taken along line 'I-I' in the liquid crystal display device according to a fifth embodiment of the present disclosure shown in FIG. 18.

Figure 21A:
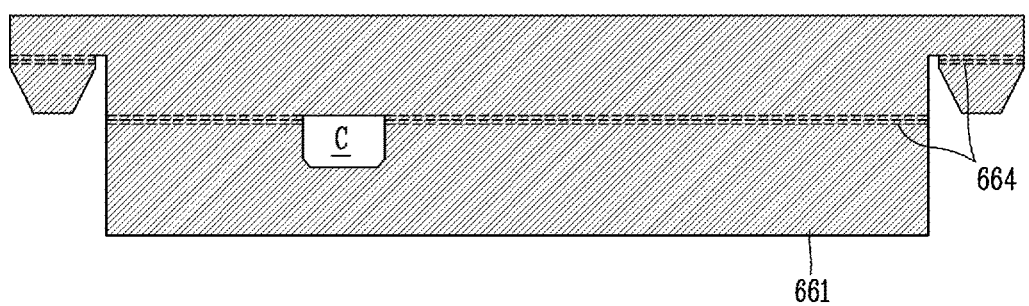
FIGS. 21A and 21B are a planar view and a rear view schematically showing a cover shield according to a fifth embodiment of the present disclosure shown in FIG. 20.
Figure 21B:
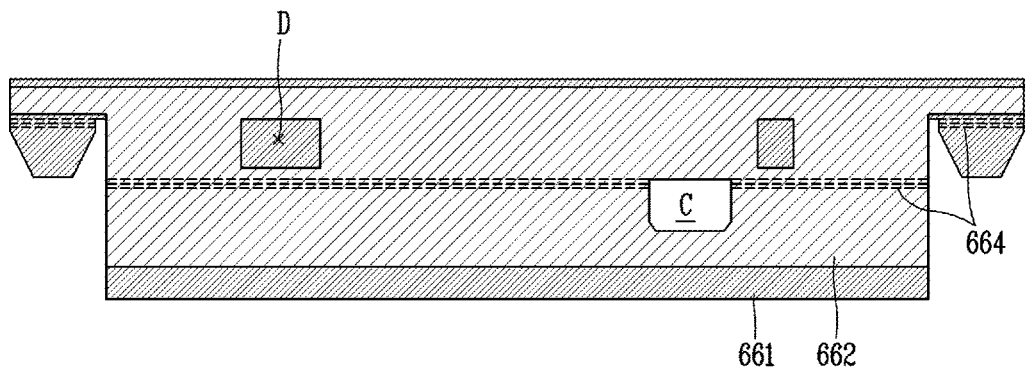

FIGS. 21A and 21B are a planar view and a rear view schematically showing a cover shield according to a fifth embodiment of the present disclosure shown in FIG. 20.

Referring to FIGS. 16 to 21A and 21B, the LCD device according to a fifth embodiment of the present disclosure may include an LC panel 610 where pixels are arranged in the form of matrices, and a backlight unit 640 disposed below the LC pane 610 and configured to supply light to the LC panel 610.

The LCD device according to a fifth embodiment of the present disclosure may further include a cover bottom 650 for supporting the backlight unit 640 in an enclosing manner.

FIG. 16 shows that a rear surface of the reflection plate 642 is exposed to the outside as a central part of the cover bottom 650 is removed. However, the present disclosure is not limited to this.

Further, a guide panel (not shown), fixed to the cover bottom 650 and configured to connect the backlight unit 640 and the LC panel 610 to each other, may be further provided.

The LCD device according to a fifth embodiment of the present disclosure may further include a protection tape 655 for covering a part of a front surface and a rear surface including the cover bottom 650 arranged at an outermost periphery and a side surface of the guide panel. Here, the front surface means a surface which is viewable to a user, i.e., a surface where an image of the LC panel 610 is displayed. And the rear surface means a rear side of the cover bottom 650, which is in an opposite direction to the front surface.

The protection tape 655 may be attached to an upper side, a left side and a right side of the LCD device, except for a lower side of the LCD device where a source PCB 635 is positioned. In this specification, the upper side means an upper side of the LCD device, and the lower side means an opposite direction to the upper side.

The LC panel 610 is configured to output an image as pixels are arranged in the form of matrices, and may include a color filter substrate 605, an array substrate 615, and an LC layer (not shown) formed at a cell gap between the color filter substrate 605 and the array substrate 615. The color filter substrate 605 and the array substrate 615 face each other, and are attached to each other such that a uniform cell gap is maintained.

Although not shown, a common electrode and a pixel electrode are formed at the LC panel 610 formed as the color filter substrate 605 and the array substrate 615 are attached to each other, thereby applying an electric field to an LC layer. If a voltage of a data signal applied to the pixel electrode is controlled in a state that a voltage has been applied to the common electrode, liquid crystals of the LC layer are rotated by dielectric anisotropy according to an electric field between the common electrode and the pixel electrode, thereby displaying a text or an image by transmitting or shielding light according to each pixel.

In order to control the voltage of the data signal applied to the pixel electrode according to each pixel, a switching device such as a thin film transistor (TFT) may be provided at each pixel.

That is, gate lines and data lines which define pixel regions by being arranged horizontally and vertically are formed on the array substrate 615, and TFTs, switching devices may be formed at crossing regions between the gate lines and the data lines.

The TFT may include a gate electrode connected to the gate line, a source electrode connected to the data line, and a drain electrode connected to the pixel electrode.

The color filter substrate 605 may include a color filter composed of a plurality of sub color filters for implementing RGB colors, a black matrix for partitioning the sub color filters from each other and transmitting light to an LC layer, and an overcoat layer formed over the color filter and the black matrix.

A polarizing plate 601 may be attached to an outer side of the color filter substrate 605, and a polarizing plate 611 may be attached to an outer side of the array substrate 615. The lower polarizing plate 611 polarizes light having passed through the backlight unit 640, and the upper polarizing plate 601 polarizes light having passed through the LC panel 610.

For instance, the cover bottom 650 may include a bottom surface and a plurality of side surfaces. The bottom surface may have a quadrangular shape. As aforementioned, the bottom surface may have its central part removed. However, the present disclosure is not limited to this. The side surfaces may vertically extend from edges of the bottom surface to have a predetermined height. Edges of the side surfaces adjacent to each other may be connected to each other. A space surrounded by the side surfaces and the bottom surface forms an accommodation space for accommodating the backlight unit 640 therein. The side surfaces may be inward bent to form a mounting unit for mounting the LC panel 610.

The cover bottom 650 may be formed of a metallic material.

The LC panel 610 formed as the color filter substrate 605 and the array substrate 615 are attached to each other is mounted on the backlight unit 640 through a guide panel, and the cover bottom 650 is coupled to a lower surface of the backlight unit 640, thereby constituting an LCD device.

The backlight unit 640 will be explained in more detail. A light source assembly 620 including a light source 623 which generates light may be installed at one side of a light guiding plate 642, and a reflector 641 may be installed on a rear surface of the light guiding plate 642.

A plurality of optical sheets 643 for irradiating light emitted from the light guiding plate 642 to the LC panel 610 after enhancing efficiency of the light may be arranged on an upper surface of the light guiding plate 642.

The light guiding plate 642 receives light from the light source 623, and guides the light to the LC panel 610. Here, the light received from the light source 623 is provided to a light incidence surface (or a light incidence portion) of the light guiding plate 642. The incidence surface faces one of side surfaces of the cover bottom 650. That is, since the light source 623 is positioned on one side surface of the cover bottom 650, the incidence surface of the light guiding plate 642 faces a light emission surface of the light source 623.

The light guiding plate 642 may be formed of polymethyl methacrylate (PMMA) or polycarbonate (PC)-based plastic.

The reflector 641 is disposed between a bottom surface of the cover bottom 650 and a rear surface of the light guiding plate 642. The reflector 641 serves to reflect light from the light source 623 and light from the light guiding plate 642, towards the LC panel 610.

The light source 623, a means to emit light, may be implemented as one of a cold cathode fluorescence lamp (CCFL), a hot cathode fluorescence lamp (HCFL), an external electrode fluorescence lamp (EEFL), and a light emitting diode (LED). However, the present disclosure is not limited to this. For convenience, the present disclosure will be explained hereinafter under an assumption that an LED is used as the light source 623.

As the light source 623, RGB LEDs for emitting RGB monochromatic light, or an LED for emitting white light may be used.

In case of an LED array for emitting monochromatic light, an LED for emitting red light, an LED for emitting green light, and an LED for emitting blue light are alternately arranged with a predetermined interval therebetween, and the RGB lights emitted from the LEDs are mixed into white light. Then, the white light is supplied to the LC panel 610. Further, in case of an LED array for emitting white light, a plurality of LEDs are arranged with a predetermined interval therebetween, and white light is supplied to the LC panel 610.

Here, the LED for emitting white light may be composed of a blue LED for emitting blue light, and a fluorescent body which emits yellow light by absorbing blue monochromatic light. Blue monochromatic light output from the blue LED and yellow monochromatic light emitted from the fluorescent body may be mixed with each other, thereby being supplied to the LC panel 610 as white light.

The LED array may be formed as a light emitting package having one or more LEDs.

The LED array serving as the light source 623 may be installed at a flexible printed circuit board (FPCB) 624 such that a light emission surface faces the light incidence surface of the light guiding plate 642.

The FPCB 624 may be installed below the light source 623, between the light guiding plate 642 and the cover bottom 650. The FPCB 624 may be attached to the cover bottom 650 by a double-sided tape (not shown).

A plurality of power lines (not shown) for transmitting power to the light source 623, and electric components (not shown) may be formed at the FPCB 624.

Light emitted from the light source 623 is incident onto a side surface of the light guiding plate 642 formed of a transparent material. And the reflector 641 disposed on a rear surface of the light guiding plate 642 reflects light transmitted to the rear surface of the light guiding plate 642, towards the optical sheets 643 which are on an upper surface of the light guiding plate 642, thereby reducing an optical loss and enhancing uniformity.

The optical sheets 643 include a diffuser sheet and upper and lower prism sheets, and may further include a protection sheet.

The prism sheets collect light from the light guiding plate 642, the diffuser sheet diffuses light from the prism sheets, and the protection sheet protects the prism sheets and the diffuser sheet. Light having passed through the protection sheet is provided to the LC panel 610.

A source printed circuit board (PCB) 635, a driving circuit for driving the LC panel 610, which is disposed outside the FPCB 624, may be connected to one side of the LC panel 610 by a flat-type chip on film (COF) 636.

In the present disclosure, a system board or a driving circuit is disposed below the LCD device in a flat state, not in a bent state. This may allow the LCD device to have a reduced thickness, and to be installed on a wall in an adhered manner.

In case of using the cover bottom 650 in a modified manner as a type of supporting member of the backlight unit 640, the cover bottom 650 may be referred to as a base frame, a metal frame, a metal chassis, a chassis base, etc. In this case, the cover bottom 150 should be understood as a concept to include all types of frames disposed at a lowermost part of the LCD device or a plate-shaped structure, as a supporting member which fixes at least one of the LC panel 610 and the backlight unit 640.

As aforementioned, in the present disclosure, the driving circuit of the LC panel 610 may be the source PCB 635 for providing a data output signal or a source output signal to the data lines of the LC panel 610.

The aforementioned COF 636, a connection circuit for connecting the driving circuit of the LC panel 610 to the LC panel 610, may be referred to as a flexible printed circuit (FPC), a Chip On Film circuit, a Chip On Flexible Printed Circuit (COFPC), etc. However, for convenience, a COF circuit will be explained as an example in this specification.

Generally, a COF, an FPC, a TCP, etc. are implemented by forming a wire, a circuit, etc. electrically connectable to another circuit wire on a bendable flexible insulating film. The COF and the TCP are similar to each other in that a circuit wire is formed on a film, a tape or the like, and can be replaced with each other because they perform the same function in the LCD device. Accordingly, in the present disclosure, the COF will be explained as a representative example.

In the present disclosure, a drive IC 638 disposed at one side of the COF 636 may be further provided.

A pad 637 of a predetermined thickness, configured to compensate for a stair-stepped portion from the color filter substrate 605, may be provided at a pad region of the array substrate 615 to which the COF 636 is attached. The pad 637 may be formed of a black-colored PET in order to prevent light leakage.

For your reference, unexplained reference numeral 631 denotes a cable for connecting the FPCB 624 to the source PCB 635, and 632, 633 denote connectors for connecting components of the source PCB 635 with an external device.

In the LCD device according to a fifth embodiment of the present disclosure, a bracket structure and screws of the conventional cover bottom are not used, but the cover shield 660 is used to fix the flat-type COF 625 and the source PCB 635 and to ground the source PCB 635. This may allow costs and an inferior rate to be reduced by simplified processes, and allow the LCD device to be slim. That is, a bracket structure for fixing the source PCB 635 is removed from the cover bottom 650, and the source PCB 635 is fixed by the cover shield 660 for attachment, not by screws for coupling. As a result, processes are simplified, and costs and an inferior rate are reduced. Further, since brackets and screws which prevent the LCD device from having a small thickness are not used, the LCD device can have a slim configuration.

Further, in the LCD device according to a fifth embodiment of the present disclosure, the source PCB 635 and the cover bottom 650 may be electrically connected to each other by the conductive cover shield 660. That is, the cover shield 660 may be attached to the LC panel 610 and the cover bottom 650 with enclosing the source PCB 635, and may be attached to a ground region (G) of the source PCB 635.

For this, the cover shield 660 according to a fifth embodiment of the present disclosure includes a conductive substrate 661 having a viscosity and formed on one surface of the cover shield 660 (an inner surface for convenience), and an insulating film 662 having a viscosity and attached onto an inner surface of the conductive substrate 661.

The conductive substrate 661 may be formed of a conductive material such as aluminum.

The insulating film 662 may be formed of PET.

The cover shield 660 may be bent in a "⊏" shape, from a rear surface of the cover bottom 650, so as to cover an edge of an upper surface of the LC panel 610 with enclosing the source PCB 635 from a lower surface of the LC panel 610. That is, the cover shield 660 may be divided into an upper part, a middle part and a lower part. The upper part may be attached to an edge of an upper surface of the LC panel 610, the middle part may enclose the source PCB 635 from a lower surface of the LC panel 610, and the lower part may be attached to a rear surface of the cover bottom 650. For instance, the upper part of the cover shield 660, one side of the insulating film 662 may be attached onto an upper surface of the pad 637, whereas the lower part of the cover shield 660, another side of the insulating film 662 may be attached to a rear surface of the cover bottom 650.

The insulating film 662 may be attached to an inner surface of the conductive substrate 661, except for partial regions of the upper and lower parts of the cover shield 660 (i.e., the end parts).

Here, the middle part of the cover shield 660, which is substantially bent, has a relatively narrow width, and may be provided with a plurality of cutting lines 664 for facilitation of bending.

In this embodiment of the present disclosure, the source PCB 635 is fixed as the cover shield 660 is attached to an entire surface of the source PCB 635 (upper and lower surfaces).

Further, the source PCB 635 according to a fifth embodiment of the present disclosure may be grounded as its ground region (G) is attached to a ground surface (D) of the conductive substrate 661. For this, in this embodiment, the insulating film 662 of the cover shield 660 is partially removed so as to be exposed to the outside of the ground surface (D) of the conductive substrate 661.

The ground region (G) may be provided on one surface of the source PCB 635 in at least one in number. A circuit component 632 may be provided on another surface of the source PCB 635, an opposite surface to the one surface where the ground region (G) is provided.

The cover shield 660 according to the present disclosure may be provided with an open portion (C) through which a connector 633 is exposed to the outside for connection with an external device.

In the LCD device according to a fifth embodiment of the present disclosure, the cover shield 660 is attached to an entire surface of the source PCB 635, and the source PCB 635 is protected from external vibrations. However, since the circuit component 632 having a low height may be repeatedly attached to and detached from the source PCB 635, noise may be generated. Further, since the circuit component 632 is repeatedly attached to and detached from the source PCB 635 at a boundary between the source PCB 635 and the backlight unit 640 when the source PCB 635 is bent, noise may be generated.

Accordingly, in a sixth embodiment of the present disclosure, a cover shield is attached only to a part of a source PCB to increase a movement of the source PCB, thereby solving noise generated when the cover shield is attached to an entire surface of the source PCB. This will be explained in more detail with reference to the attached drawings.

Figure 22:
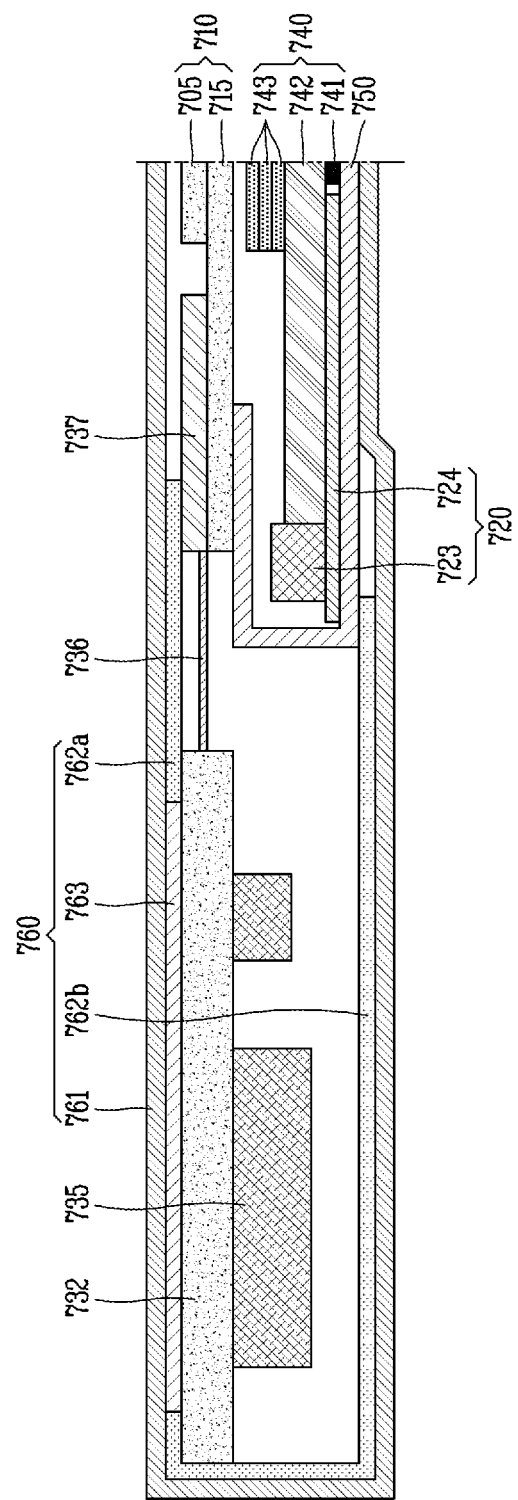
FIG. 22 is a sectional view schematically showing a part of a structure of a liquid crystal display device according to a sixth embodiment of the present disclosure.
Figure 23A:
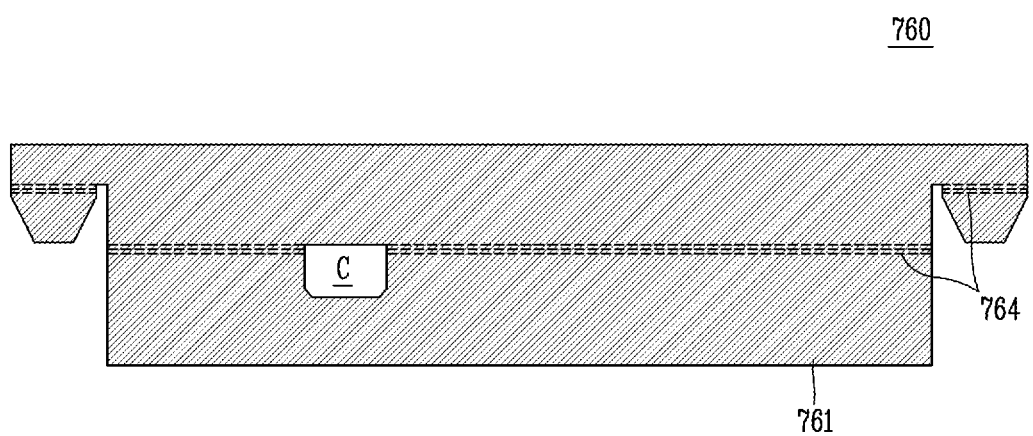
FIGS. 23A and 23B are a planar view and a rear view schematically showing a cover shield according to a sixth embodiment of the present disclosure shown in FIG. 22.
Figure 23B:
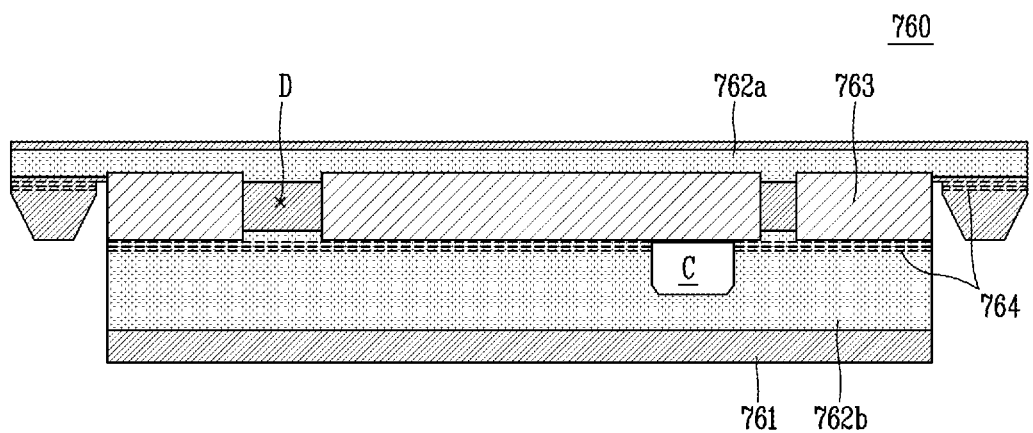

FIG. 22 is a sectional view schematically showing a part of a structure of a liquid crystal display device according to a sixth embodiment of the present disclosure, and FIGS. 23A and 23B are a planar view and a rear view schematically showing a cover shield according to a sixth embodiment of the present disclosure shown in FIG. 22.

Referring to FIGS. 22, 23A and 23B, the LCD device according to a sixth embodiment of the present disclosure may include an LC panel 710 where pixels are arranged in the form of matrices, and a backlight unit 740 disposed below the LC pane 710 and configured to supply light to the LC panel 710.

The LCD device according to a sixth embodiment of the present disclosure may further include a cover bottom 750 for supporting the backlight unit 740 in an enclosing manner.

A guide panel (not shown) formed of a plastic material may be further provided to connect the backlight unit 740 and the LC panel 710 to each other in a fixed state to the cover bottom 750.

The LCD device may further include a protection tape (not shown) for covering a part of a front surface and a rear surface including the cover bottom 750 arranged at an outermost periphery and a side surface of the guide panel. Here, the front surface means a surface which is viewable to a user, i.e., a surface where an image of the LC panel 710 is displayed. And the rear surface means a rear side of the cover bottom 750, which is an opposite direction to the front surface.

As aforementioned, the protection tape may be attached to an upper side, a left side and a right side of the LCD device, except for a lower side of the LCD device where a source PCB 735 is positioned. In this specification, the upper side means an upper side of the LCD device, and the lower side means an opposite direction to the upper side.

The LC panel 710 is configured to output an image as pixels are arranged in the form of matrices, and may include a color filter substrate 705, an array substrate 715, and an LC layer (not shown) formed at a cell gap between the color filter substrate 705 and the array substrate 715.

Although not shown, polarizing plates may be attached to an outer side of the color filter substrate 705 and the array substrate 715. The lower polarizing plate polarizes light having passed through the backlight unit 740, and the upper polarizing plate polarizes light having passed through the LC panel 710.

For instance, the cover bottom 750 may include a bottom surface and a plurality of side surfaces. The bottom surface may have a quadrangular shape. Similar to the aforementioned first embodiment, the bottom surface may have its central part removed. However, the present disclosure is not limited to this. The side surfaces may vertically extend from edges of the bottom surface to have a predetermined height. Edges of the side surfaces adjacent to each other may be connected to each other. A space surrounded by the side surfaces and the bottom surface forms an accommodation space for accommodating the backlight unit 740 therein. The side surfaces may be inward bent to form a mounting unit for mounting the LC panel 710.

The cover bottom 750 may be formed of a metallic material.

The LC panel 710 formed as the color filter substrate 705 and the array substrate 715 are attached to each other is mounted on the backlight unit 740 through a guide panel, and the cover bottom 750 is coupled to a lower surface of the backlight unit 740, thereby constituting an LCD device.

The backlight unit 740 will be explained in more detail. A light source assembly 720 including a light source 723 which generates light may be installed at one side of a light guiding plate 742, and a reflector 741 may be installed on a rear surface of the light guiding plate 742.

A plurality of optical sheets 743 for irradiating light emitted from the light guiding plate 742 to the LC panel 710 after enhancing efficiency of the light may be arranged on an upper surface of the light guiding plate 742.

The light guiding plate 742 may be formed of polymethyl methacrylate (PMMA) or polycarbonate (PC)-based plastic.

The reflector 741 is disposed between a bottom surface of the cover bottom 750 and a rear surface of the light guiding plate 742. The reflector 741 serves to reflect light from the light source 723 and light from the light guiding plate 742, towards the LC panel 710.

The light source 723, a means to emit light, may be implemented as one of a cold cathode fluorescence lamp (CCFL), a hot cathode fluorescence lamp (HCFL), an external electrode fluorescence lamp (EEFL), and a light emitting diode (LED). However, the present disclosure is not limited to this. For convenience, the present disclosure will be explained hereinafter under an assumption that an LED is used as the light source 723.

The LED array may be formed as a light emitting package having one or more LEDs.

The LED array serving as the light source 723 may be installed at a flexible printed circuit board (FPCB) 724 such that a light emission surface faces a light incidence surface of the light guiding plate 742.

The FPCB 724 may be installed below the light source 723, between the light guiding plate 742 and the cover bottom 750. The FPCB 724 may be attached to the cover bottom 750 by a double-sided tape (not shown).

A plurality of power lines (not shown) for transmitting power to the light source 723, and electric components (not shown) may be formed at the FPCB 724.

A source printed circuit board (PCB) 735, a driving circuit for driving the LC panel 710, which is disposed outside the FPCB 724, may be connected to one side of the LC panel 710 by a flat-type chip on film (COF) 736.

In the present disclosure, a system board or a driving circuit is disposed below the LCD device in a flat state, not in a bent state. This may allow the LCD device to have a reduced thickness, and to be installed on a wall in an adhered manner.

In case of using the cover bottom 750 in a modified manner as a type of supporting member of the backlight unit 740, the cover bottom 750 may be referred to as a base frame, a metal frame, a metal chassis, a chassis base, etc. In this case, the cover bottom 750 should be understood as a concept to include all types of frames disposed at a lowermost part of the LCD device or a plate-shaped structure, as a supporting member which fixes at least one of the LC panel 710 and the backlight unit 740.

As aforementioned, in the present disclosure, the driving circuit of the LC panel 710 may be the source PCB 735 for providing a data output signal or a source output signal to data lines of the LC panel 710.

In the present disclosure, a drive IC (not shown) disposed at one side of the COF 736 may be further provided.

A pad 737 of a predetermined thickness, configured to compensate for a stair-stepped portion from the color filter substrate 705, may be provided at a pad region of the array substrate 715 to which the COF 736 is attached. The pad 737 may be formed of a black-colored PET in order to prevent light leakage.

For your reference, unexplained reference numeral 732 denotes a circuit component of the source PCB 735.

In the LCD device according to a sixth embodiment of the present disclosure, similar to the aforementioned embodiment, a bracket structure and screws of the conventional cover bottom are not used, but the cover shield 760 is used to fix the flat-type COF 725 and the source PCB 735 and to ground the source PCB 735.

This may allow costs and an inferior rate to be reduced by simplified processes, and allow the LCD device to be slim. That is, a bracket structure for fixing the source PCB 735 is removed from the cover bottom 750, and the source PCB 735 is fixed by the cover shield 760 for attachment, not by screws for coupling. As a result, processes are simplified, and costs and an inferior rate are reduced.

Further, since brackets and screws which prevent the LCD device from having a small thickness are not used, the LCD device can have a slim configuration.

Further, in the LCD device according to a sixth embodiment of the present disclosure, the source PCB 735 and the cover bottom 750 may be electrically connected to each other by the conductive cover shield 760. That is, the cover shield 760 may be attached to the LC panel 710 and the cover bottom 750 with enclosing the source PCB 735, and may be attached to a ground region (G) of the source PCB 735.

In the LCD device according to a sixth embodiment of the present disclosure, the cover shield 760 is attached only to a part of the source PCB 735 to increase a movement of the source PCB 735.

For this, the cover shield 760 according to a sixth embodiment of the present disclosure includes a conductive substrate 761 having a viscosity and formed on an inner surface of the cover shield 760. Insulating films 762*a*, 762*b*, 763 are attached onto an inner surface of the conductive substrate 761. The insulating films 762a, 762b, 763 may include first insulating films 762a, 762b having no viscosity, and a second insulating films 763 having a viscosity.

The conductive substrate 761 may be formed of a conductive material such as aluminum.

The insulating films 762a, 762b, 763 may be formed of PET. The PET may be transparent.

The cover shield 760 may be bent in a "⊏" shape, from a rear surface of the cover bottom 750, so as to cover an edge of an upper surface of the LC panel 710 with enclosing the source PCB 735 from a lower surface of the LC panel 710.

The cover shield 760 may be divided into an upper part, a middle part and a lower part which correspond to an upper part, a side surface and a lower part of the LCD device, respectively.

The upper part of the cover shield 760 may be attached to an edge of an upper surface of the LC panel 710. That is, the first upper insulating film 762a is attached to one upper part of the cover shield 760 except for an end in a lengthwise direction. And the upper end of the cover shield 760, to which the first upper insulating film 762a has not been attached, is attached to an edge of an upper surface of the LC panel 710. As the first upper insulating film 762a having no viscosity is disposed on the pad 737, bending noise of the source PCB 735 may be prevented.

The first upper insulating film 762a having no viscosity may be attached to an inner surface of one upper part which faces a ground region (G) of the source PCB 735.

The second insulating film 763 having a viscosity may be attached to another upper part of the cover shield 760, to which the first upper insulating film 762a has not been attached. The second insulating film 763 may be separated into a plurality of regions such that a ground surface (D) of a conductive substrate 761 may be exposed to the outside.

The first upper and lower insulating films 762a, 762b may be partially overlapped with the second insulating film 763. However, the present disclosure is not limited to this.

The middle part of the cover shield 760 may enclose the source PCB 735 from a lower surface of the LC panel 710, and the lower part of the cover shield 760 may be attached to a rear surface of the cover bottom 750. That is, the first lower insulating film 762b is attached to a lower part of the cover shield 760 except for an end in a lengthwise direction. And the lower end of the cover shield 760, to which the first lower insulating film 762b has not been attached, is attached to a rear surface of the cover bottom 750. As the first lower insulating film 762b having no viscosity is disposed on a circuit component 732 of the source PCB 735, the circuit component 732 is neither attached to the source PCB 735 nor detached from the source PCB 735 when the source PCB 735 is bent. This may prevent bending noise of the source PCB 735.

The first lower insulating film 762b having no viscosity may be attached to an inner surface of the lower part of the cover shield 760 which faces the circuit component 732.

Here, the middle part of the cover shield 760, which is substantially bent, has a relatively narrow width, and may be provided with a plurality of cutting lines 764 for facilitation of bending.

In the sixth embodiment of the present disclosure, the cover shield 760 is attached only to a part of an upper surface of the source PCB 735 to fix the source PCB 735. This may increase a movement of the source PCB 735, thereby solving noise generated when the cover shield is attached to an entire surface of the source PCB.

Similar to the aforementioned first embodiment, in the sixth embodiment, the source PCB 735 may be grounded as the ground region (G) of the source PCB 735 is attached to the ground surface (D) of the conductive substrate 761. For this, the second insulating film 763 of the cover shield 760 according to the sixth embodiment of the present disclosure is separated into a plurality of regions such that the ground surface (D) of the conductive substrate 761 is exposed to the outside.

The ground region (G) may be provided on one surface of the source PCB 735 in at least one in number. The circuit component 732 may be provided on another surface of the source PCB 735, an opposite surface to the one surface where the ground region (G) is provided.

The cover shield 760 according to the present disclosure may be provided with an open portion (C) through which a connector 733 is exposed to the outside for connection with an external device.

The terminology used herein is for the purpose of describing particular embodiments only and is not intended to be limiting of example embodiments. As used herein, the singular forms are intended to include the plural forms as well, unless the context clearly indicates otherwise. It will be further understood that the terms "comprises", "comprising", "includes" and/or "including," if used herein, specify the presence of stated steps, operations, elements and/or components, but do not preclude the presence or addition of one or more other features, integers, steps, operations, elements, components and/or groups thereof.

The above description is merely intended to illustratively describe the technical spirit of the present disclosure, and those skilled in the art to which the present disclosure pertains, various changes and modifications may be possible without departing from the essential features of the present disclosure. Therefore, the embodiments disclosed in the present disclosure are not intended to limit the technical spirit of the present disclosure and are merely intended to describe the present disclosure, and the technical spirit of the present disclosure is not limited by those embodiments of the present disclosure. The scope of protection of the present disclosure should be interpreted by the accompanying claims, and all technical spirits in equivalents thereof should be interpreted as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
a liquid crystal panel;
a cover bottom disposed below the liquid crystal panel; and a single piece PCB fixing bracket protruding from the cover bottom, configured to accommodate at least a portion of a driving PCB for the liquid crystal panel, the single piece PCB fixing bracket including a lower horizontal portion, an upper horizontal portion and a vertical side surface portion directly connecting the lower horizontal portion and the upper horizontal portion to one another, the lower horizontal portion, the upper horizontal portion and the vertical side surface portion configured to enclose a respective one of three surfaces of the portion of the driving PCB, including an upper surface and a bottom surface of the portion of the driving PCB, the upper horizontal portion being shorter than the lower horizontal portion in a horizontal direction;

wherein the driving PCB includes a first PCB ground region directly on the upper surface of the driving PCB and directly contacting the upper horizontal portion of the PCB fixing bracket, and a second PCB ground region directly on the lower surface of the driving PCB and directly contacting the lower horizontal portion of the PCB fixing bracket.

2. The liquid crystal display device of claim 1, wherein:
the lower horizontal portion protrudes from the cover bottom;
the upper horizontal portion is spaced apart from the lower horizontal portion by a distance and faces the lower horizontal portion; and
the lower horizontal portion, the upper horizontal portion and the vertical side surface portion forms a PCB accommodation portion.

3. The liquid crystal display device of claim 2, wherein the PCB accommodation portion includes an inner side surface of the upper horizontal portion including a plurality of embossed portions.

4. The liquid crystal display device of claim 1, wherein the lower horizontal portion, the upper horizontal portion, and the vertical side surface portion of the PCB fixing bracket are integrally formed with the cover bottom.

5. The liquid crystal display device of claim 1, wherein the first or second PCB ground region is formed of a metallic material including gold (Au).

6. The liquid crystal display device of claim 1, wherein the upper horizontal portion including a plurality of convex portions and concave portions.

7. The liquid crystal display device of claim 1, wherein the upper horizontal portion including a clip structure.

8. A liquid crystal display device, comprising:
a liquid crystal (LC) panel;
a backlight unit and a cover bottom disposed on a rear surface of the LC panel;
a printed circuit board (PCB) bracket extending from a side surface of the cover bottom; a source PCB electrically connected to the LC panel, disposed on an upper surface of the PCB bracket, and having a ground region on an upper surface of the source PCB, the upper surface of the source PCB being opposite to and further away from the upper surface of the PCB bracket than a lower surface of the source PCB;
a metal cover shield attached to the LC panel and the cover bottom, the metal cover shield having a horizontal upper inner surface, a horizontal lower inner surface, and a vertical side inner surface enclosing, respectively, the upper surface of the source PCB, the lower surface of the source PCB and a side surface of the source PCB that directly connects the upper surface and the lower surface of source PCB to one another, the horizontal upper inner surface of the metal cover shield directly and electrically contacting the ground region of the source PCB;
an insulation sheet positioned directly on the vertical side inner surface and the horizontal lower inner surface of the metal cover shield, the insulating sheet including a contact hole, through which the upper inner surface of the metal cover shield is directly and electrically connected to the ground region of the source PCB, and
a conductive adhesion portion disposed directly on the horizontal upper inner surface or the horizontal lower inner surface of the metal cover shield at one or both of an upper side and a lower side of the insulating sheet.

9. The liquid crystal display device of claim 8, wherein the metal cover shield is bent to cover from an upper surface of the LC panel to a lower surface of the cover bottom.

10. The liquid crystal display device of claim 8, wherein a non-conductive adhesion tape is interposed between the source PCB and the PCB bracket.

11. A liquid crystal display device, comprising:
a source printed circuit board (PCB) connected to a liquid crystal (LC) panel, and having one or more ground regions on a first surface of the source PCB,
a cover bottom for accommodating and supporting the LC panel and a backlight unit;
a conductive cover shield attached to the LC panel and the cover bottom, the conductive cover shield having a horizontal first inner surface, a horizontal second inner surface and a vertical third inner surface enclosing, respectively, an upper surface of the source PCB, an lower surface of the source PCB and a side surface of the source PCB, the horizontal first inner surface facing the horizontal second inner surface, the vertical third inner surface extending between the horizontal first inner surface and the horizontal second inner surface, and at least a portion of the horizontal first inner surface directly and electrically contacting a ground region of the one or more ground regions of the source PCB; and
an insulation layer directly positioned on the horizontal second inner surface and the vertical third inner surface of the conductive cover shield and exposing the at least a portion the horizontal first inner surface of the conductive cover shield, and the insulation layer including a first upper insulating film having no viscosity, a first lower insulating film having no viscosity, and a second insulating film having a viscosity and disposed between the first upper insulating film and the first lower insulating film.

12. The liquid crystal display device of claim 11, wherein a circuit component is mounted to a second surface of the source PCB.

13. The liquid crystal display device of claim 11, wherein the first upper insulating film being attached to a first upper part of the conductive cover shield, which faces the ground region of the source PCB.

14. The liquid crystal display device of claim 13, wherein the second insulating film being attached to a second upper part of the conductive cover shield.

15. The liquid crystal display device of claim 14, wherein the second insulating film is separated into a plurality of regions in a manner that the at least a portion of the horizontal first inner surface is exposed to outside.

16. The liquid crystal display device of claim 15, wherein the first lower insulating film being attached to a lower part of the conductive cover shield which faces a circuit component.

17. The liquid crystal display device of claim 16, wherein the first upper insulating film and the first lower insulating films are each partially overlapped with the second insulating film.

18. The liquid crystal display device of claim 16, wherein the conductive cover shield includes a plurality of cutting lines configured for bending at a middle part of the conductive cover shield between an upper part and the lower part.

19. The liquid crystal display device of claim 16, wherein the first lower insulating film directly contacts the vertical third inner surface of the conductive cover shield without contacting a lower end of the conductive cover shield, and the lower end of the conductive cover shield being attached to the cover bottom.

20. The liquid crystal display device of claim 16, wherein the first lower insulating film is disposed on a rear surface of the cover bottom.

21. The liquid crystal display device of claim 13, wherein the first upper insulating film directly contacts the horizontal first inner surface of the conductive cover shield without contacting an upper end of the conductive cover shield, and the upper end of the conductive cover shield being attached to the LC panel.

22. The liquid crystal display device of claim 13, further comprising a flat type chip-on-film (COF) for connecting the LC panel and the source PCB with one another.

23. The liquid crystal display device of claim 22, wherein the COF is attached to a pad region of an array substrate of the LC panel, and the pad region including a pad for compensating for a stair-stepped portion from a color filter substrate.

24. The liquid crystal display device of claim 23, wherein the first upper insulating film is disposed on the pad.

* * * * *